US011996967B2

(12) United States Patent
Sengupta et al.

(10) Patent No.: US 11,996,967 B2
(45) Date of Patent: May 28, 2024

(54) LOW PEAK-TO-AVERAGE POWER RATIO (PAPR) REFERENCE SIGNAL (RS) DESIGN FOR HIGH FREQUENCY BANDS

(71) Applicant: Intel Corporation, Santa Clara, CA (US)

(72) Inventors: Avik Sengupta, San Jose, CA (US); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 17/097,810

(22) Filed: Nov. 13, 2020

(65) Prior Publication Data

US 2021/0067391 A1     Mar. 4, 2021

Related U.S. Application Data

(60) Provisional application No. 62/951,962, filed on Dec. 20, 2019, provisional application No. 62/941,363, filed on Nov. 27, 2019, provisional application No. 62/936,296, filed on Nov. 15, 2019.

(51) Int. Cl.
*H04L 27/26* (2006.01)
*H04J 13/00* (2011.01)

(52) U.S. Cl.
CPC ...... *H04L 27/2614* (2013.01); *H04J 13/0014* (2013.01); *H04J 13/004* (2013.01); *H04L 27/26132* (2021.01); *H04L 27/2636* (2013.01)

(58) Field of Classification Search
CPC .......... H04L 27/2614; H04L 27/26132; H04L 27/2636; H04L 27/2613; H04J 13/0014; H04J 13/004

USPC ....................................................... 370/329
See application file for complete search history.

(56) References Cited

U.S. PATENT DOCUMENTS

| | | | | |
|---|---|---|---|---|
| 2006/0007850 A1* | 1/2006 | Park | ...................... | H04L 5/0048 370/310 |
| 2012/0201316 A1* | 8/2012 | Zhang | ....................... | H04L 1/08 375/260 |
| 2012/0320880 A1* | 12/2012 | Han | ....................... | H04J 11/005 370/335 |
| 2013/0136071 A1* | 5/2013 | Han | ..................... | H04L 27/2636 370/329 |
| 2014/0029681 A1* | 1/2014 | Zhang | ................. | H04L 27/2613 375/260 |
| 2017/0366377 A1* | 12/2017 | Papasakellariou | .... | H04L 5/0053 |
| 2018/0205586 A1* | 7/2018 | Park | ..................... | H04L 27/2636 |
| 2018/0262366 A1* | 9/2018 | Sahin | .................... | H04B 7/0617 |
| 2019/0036656 A1* | 1/2019 | Berggren | ............... | H04L 5/001 |
| 2019/0036746 A1* | 1/2019 | Hwang | ................. | H04L 5/0051 |

(Continued)

*Primary Examiner* — Tejis Daya
*Assistant Examiner* — Oladiran Gideon Olaleye
(74) *Attorney, Agent, or Firm* — Schwabe, Williamson & Wyatt, P.C.

(57) ABSTRACT

Various embodiments herein provide techniques for reference signal (RS) configuration for high frequency bands (e.g., frequency above 52.6 GHz). For example, embodiments may include techniques for configuration of a demodulation reference signal (DM-RS), a channel state information reference signal (CSI-RS), and/or a sounding reference signal (SRS). The RS configuration may provide a low peak-to-average power ratio (PAPR) compared to prior techniques. Other embodiments may be described and claimed.

17 Claims, 16 Drawing Sheets

5G NR DM-RS Types

TYPE 1
DM-RS

TYPE 2
DM-RS

(56) References Cited

U.S. PATENT DOCUMENTS

| | | | |
|---|---|---|---|
| 2019/0089504 A1* | 3/2019 | Hwang | H04L 27/26 |
| 2019/0149381 A1* | 5/2019 | Vos | H04L 27/3444 370/329 |
| 2019/0158339 A1* | 5/2019 | Park | H04L 27/3411 |
| 2020/0112466 A1* | 4/2020 | Yang | H04L 27/2643 |
| 2020/0119874 A1* | 4/2020 | Liu | H04W 72/042 |
| 2021/0203538 A1* | 7/2021 | Kim | H04L 27/2614 |
| 2022/0247536 A1* | 8/2022 | Matsumura | H04L 5/0051 |

* cited by examiner

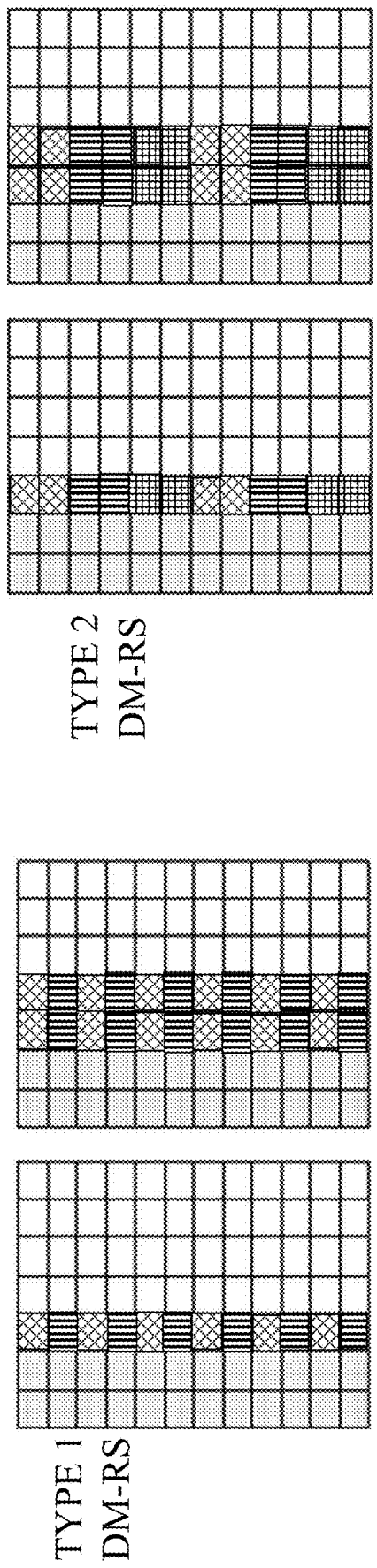

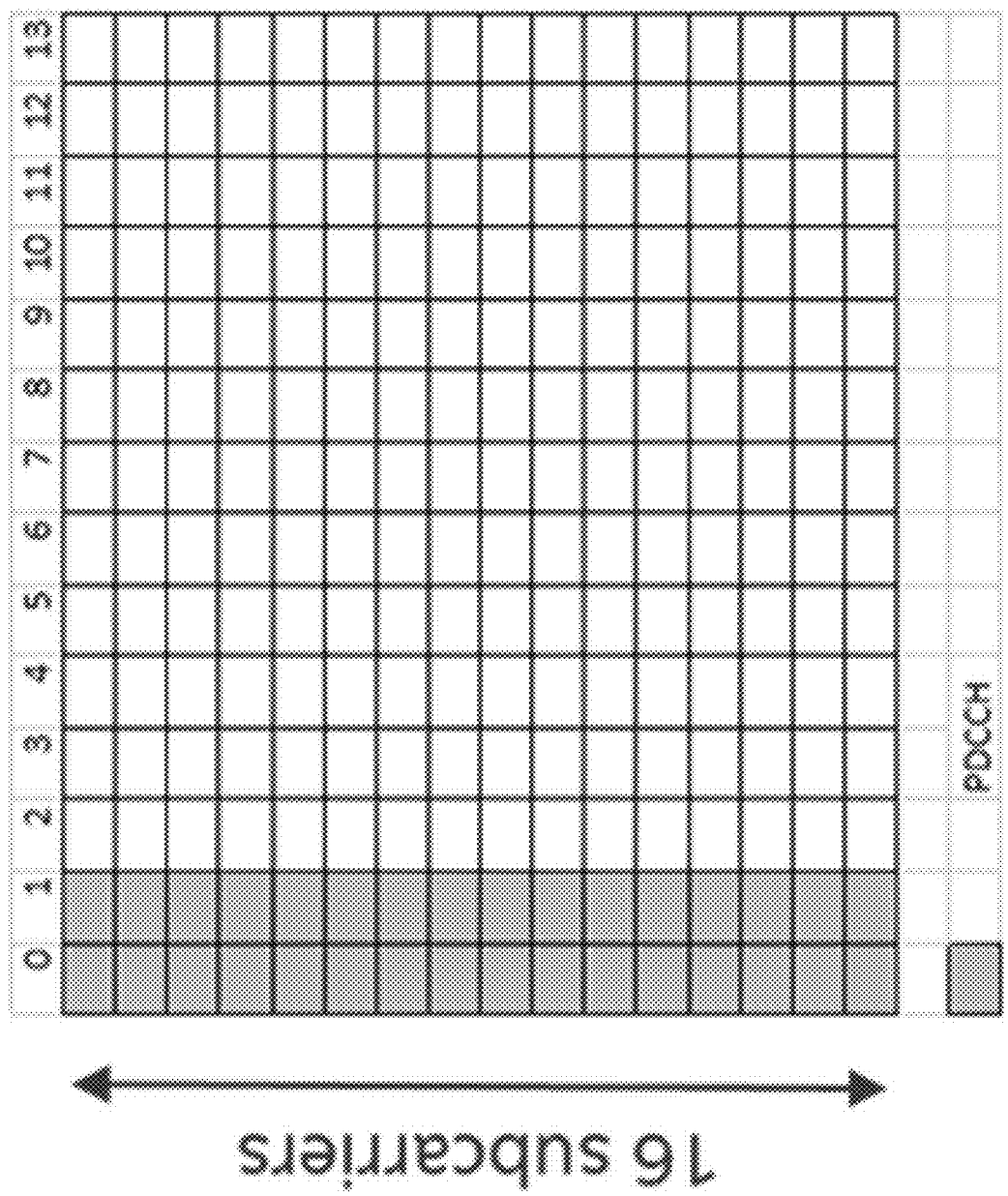
Figure 2: Time-Frequency Resource grid for NR operation above 52.4GHz

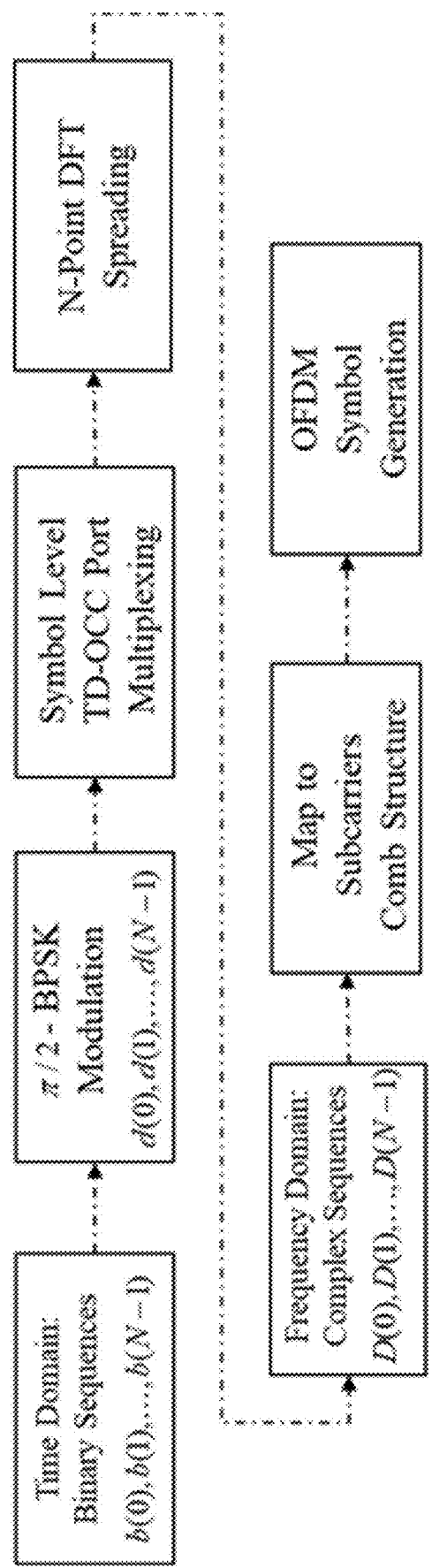
Figure 3: Low PAPR DM-RS Generation

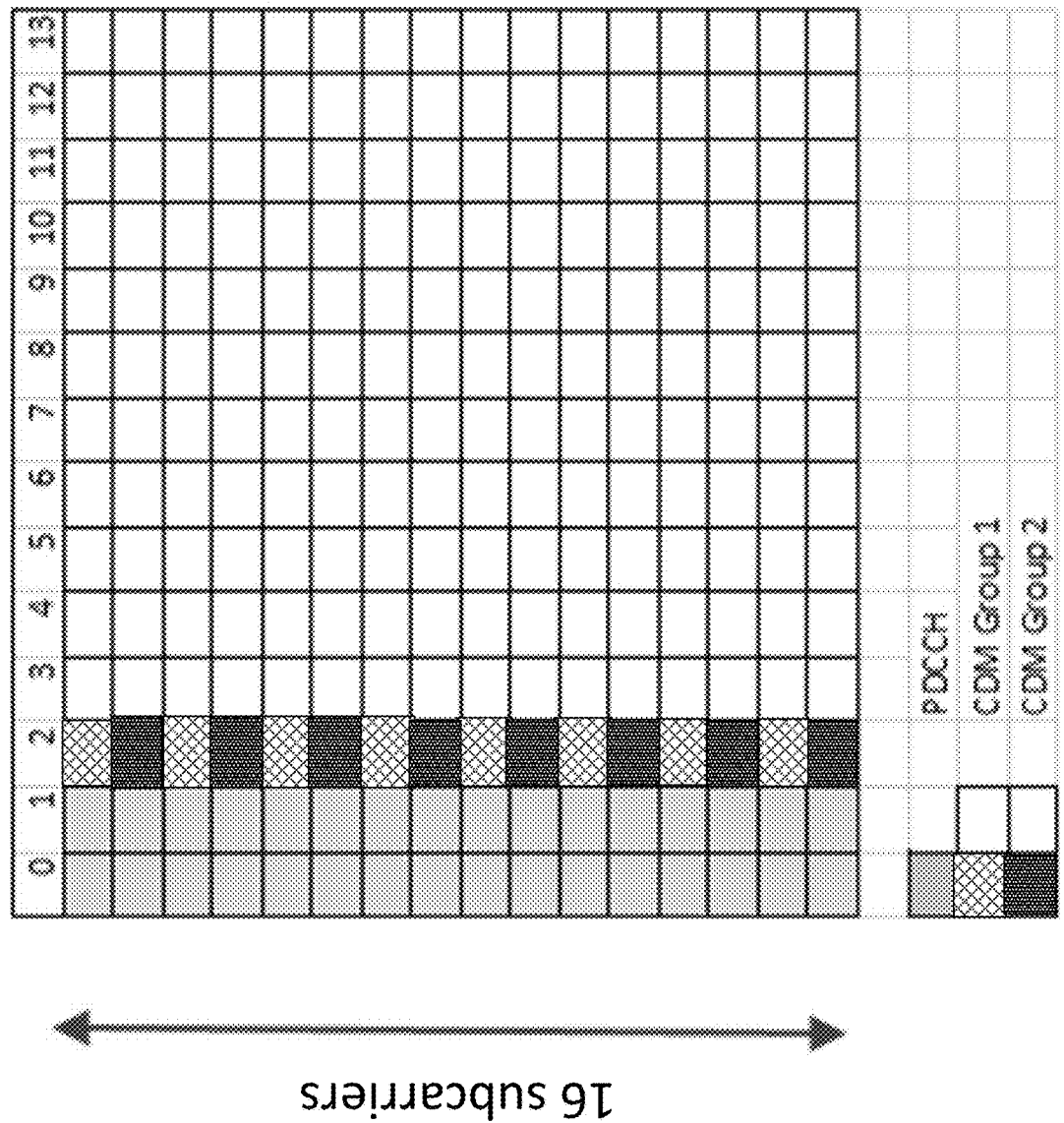
Figure 4: DM-RS Mapping to Physical Resources

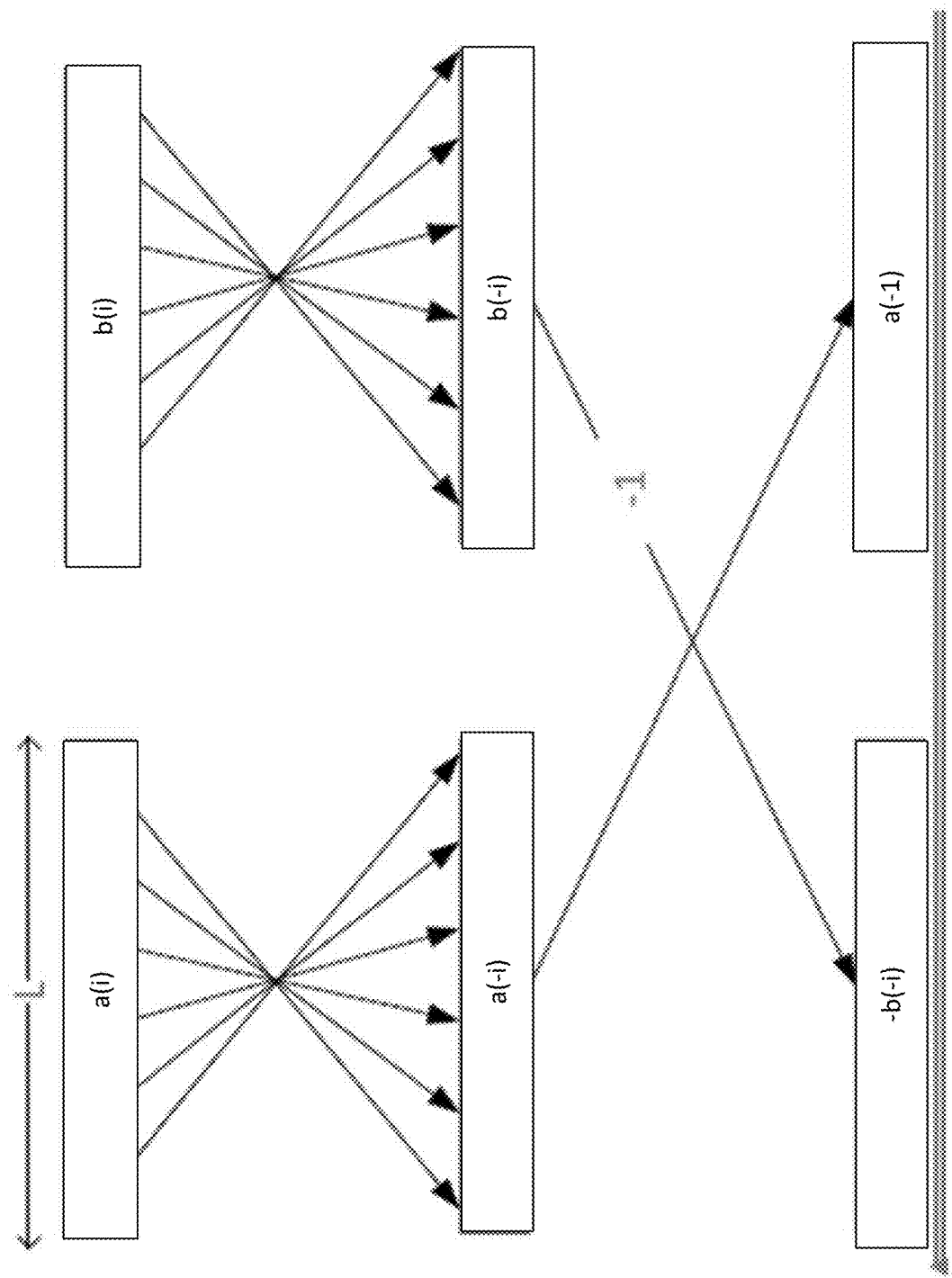
Figure 5: Illustration of the generation of the orthogonal DM-RS port

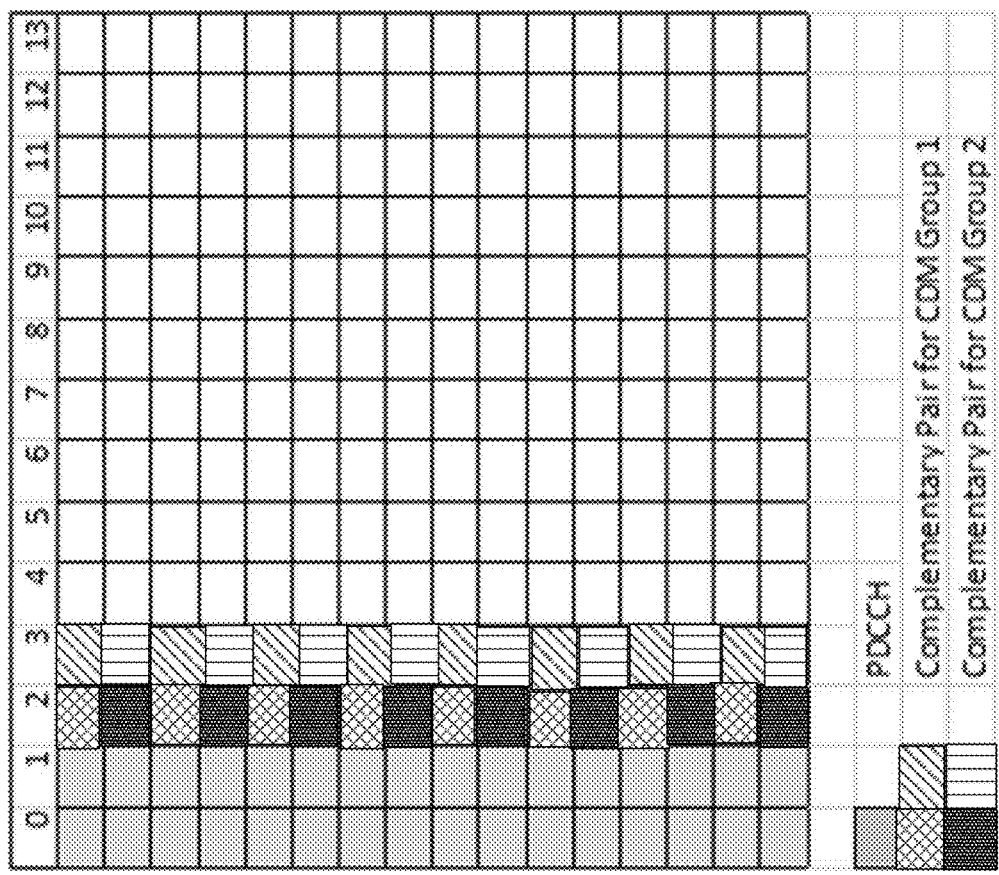
Figure 6: Resource Mapping for Complementary DM-RS Sequence Pairs

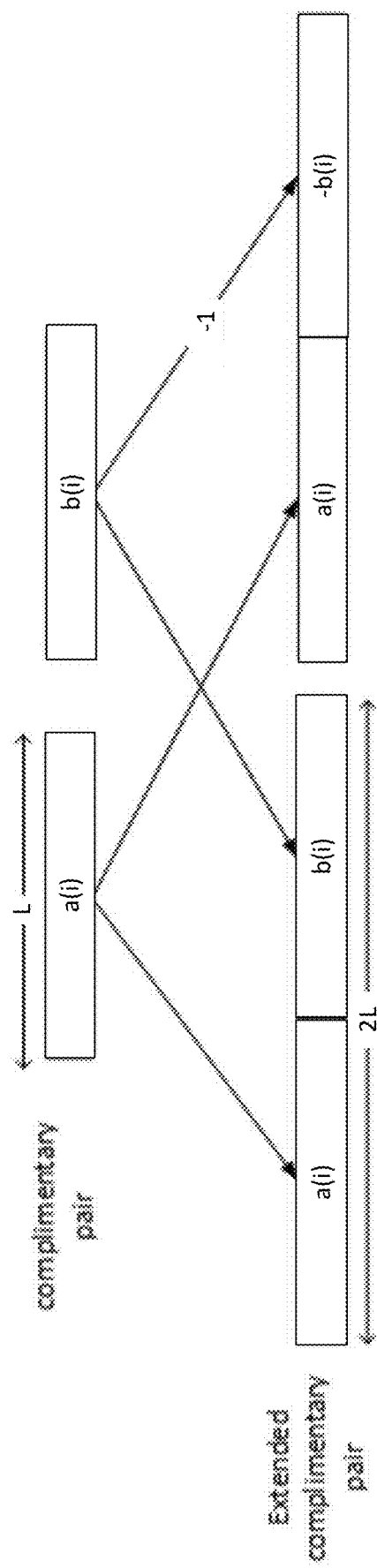
Figure 7A: DM-RS Extension using Concatenation of Complementary Pairs

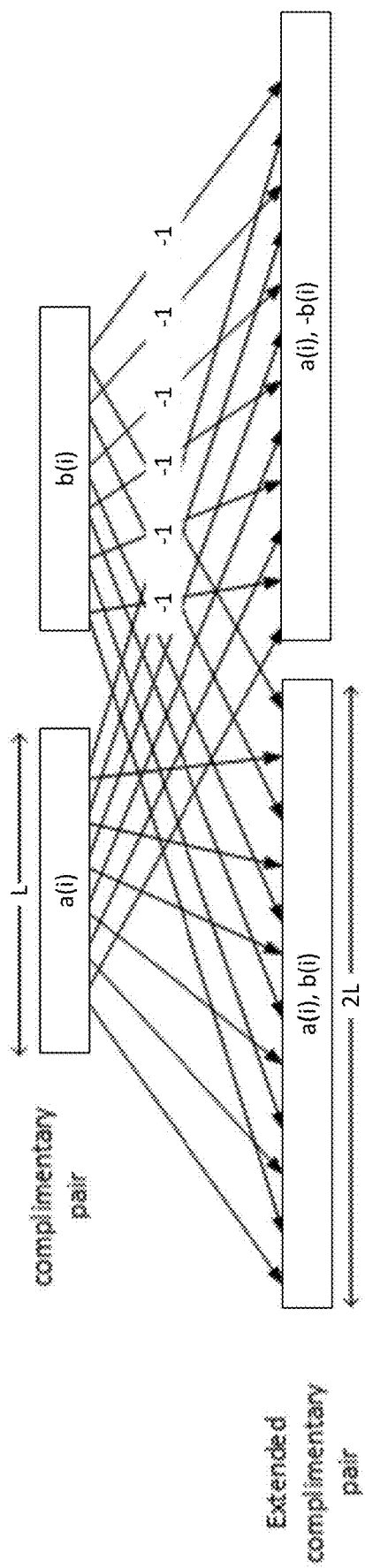
Figure 7B: DM-RS Extension using Interleaving of Complementary Pairs

LOW PEAK-TO-AVERAGE POWER RATIO (PAPR) REFERENCE SIGNAL (RS) DESIGN FOR HIGH FREQUENCY BANDS

CROSS REFERENCE TO RELATED APPLICATION

The present application claims priority to U.S. Provisional Patent Application No. 62/936,296, which was filed Nov. 15, 2019; U.S. Provisional Patent Application No. 62/941,363, which was filed Nov. 27, 2019; U.S. Provisional Patent Application No. 62/951,962, which was filed Dec. 20, 2019; the disclosures of which are hereby incorporated by reference.

FIELD

Embodiments relate generally to the technical field of wireless communications.

BACKGROUND

Third Generation Partnership Project (3GPP) Release (Rel)-15 New Radio (NR) defines two types of waveforms—cyclic prefix (CP)-orthogonal frequency divisional multiplexing (OFDM) and discrete Fourier transform (DFT)-spread (s)-OFDM. The downlink transmission supports CP-OFDM waveform only, while uplink (UL) transmission supports both CP-OFDM and DFT-s-OFDM waveform. CP-OFDM waveform is used to provide improved spectral efficiency, while DFT-s-OFDM, due to low peak-to-average power ratio (PAPR), improves power efficiency. For communication links at 60 GHz and above the power efficiency becomes important not only for UL, but also for downlink (DL).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 illustrates Type-1 and Type-2 demodulation (DM)-reference signal (RS) in 5G New Radio (NR), in accordance with various embodiments.

FIG. 2 illustrates a time-frequency resource grid for NR operation above 52.4 GigaHertz (GHz), in accordance with various embodiments.

FIG. 3 illustrates a process for low peak-to-average power ratio (PAPR) DM-RS generation, in accordance with various embodiments.

FIG. 4 illustrates DM-RS mapping to physical resources, in accordance with various embodiments.

FIG. 5 illustrates generation of an orthogonal DM-RS port, in accordance with various embodiments.

FIG. 6 illustrates resource mapping for complementary DM-RS sequence pairs, in accordance with various embodiments.

FIG. 7A illustrates DM-RS extension using concatenation of complementary pairs, in accordance with various embodiments.

FIG. 7B illustrates DM-RS extension using interleaving of complementary pairs, in accordance with various embodiments.

DETAILED DESCRIPTION

Figure 8A:
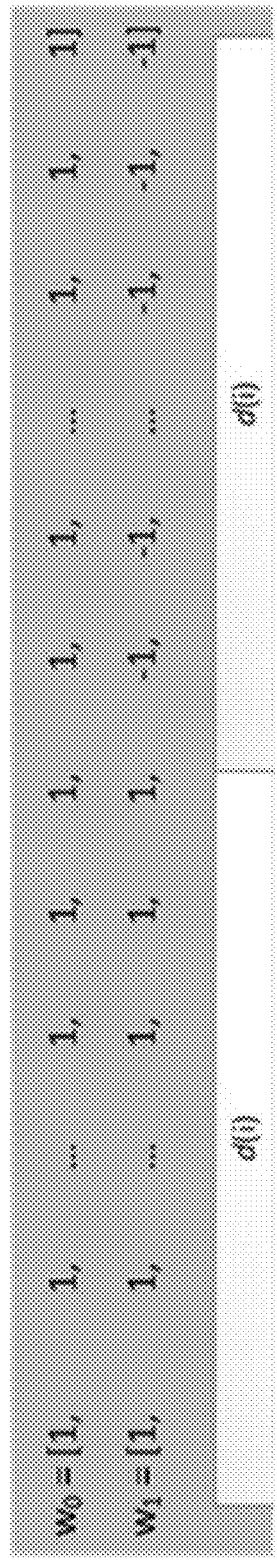
FIG. 8A illustrates time-domain repetition with P=2 and group-level cover code, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various embodiments herein provide techniques for reference signal (RS) configuration for high frequency bands (e.g., frequency above 52.6 GHz). For example, embodiments may include techniques for configuration of a demodulation reference signal (DM-RS), a channel state information reference signal (CSI-RS), and/or a sounding reference signal (SRS). The RS configuration may provide a low peak-to-average power ratio (PAPR) compared to prior techniques.

3GPP Release (Rel)-15 New Radio (NR) defines two types of waveforms—cyclic prefix (CP)-orthogonal frequency divisional multiplexing (OFDM) and discrete Fourier transform (DFT)-spread (s)-OFDM. The downlink transmission supports CP-OFDM waveform only, while uplink (UL) transmission supports both CP-OFDM and DFT-s-OFDM waveform. CP-OFDM waveform is used to provide improved spectral efficiency, while DFT-s-OFDM, due to low peak-to-average power ratio (PAPR), improves power efficiency. For communication links at 60 GHz and above the power efficiency becomes important not only for UL, but also for downlink (DL).

For downlink data transmission, 5G NR supports only CP-OFDM waveform. Channel estimation for coherent data reception is facilitated by transmission of demodulation reference signal (DM-RS). DM-RS is defined in the frequency domain by QPSK modulated by PN sequence obtained from length-31 Gold code generator. The Gold code generator for PN sequence is initialized at the start of each OFDM symbol using the following seed $$c_{int} = \left(2^{17}(N_{symb}^{slot}n_{s,f}^{\mu}+l+1)\left(2N_{ID}^{n_{SCID}^{\lambda}}+1\right)+2^{17}\left\lfloor\frac{\lambda}{2}\right\rfloor+2N_{ID}^{n_{SCID}^{\lambda}}+n_{SCID}^{\lambda}\right) \mod 2^{31}$$

where $l$ is the OFDM symbol number within the slot, $n_{s,f}^{\mu}$ is the slot number within a frame, and $N_{ID}^{0}$, $N_{ID}^{1} \in \{0, 1, \ldots, 65535\}$ are given by the higher-layer parameters scramblingID0 and scramblingID1, respectively, in the DMRS-UplinkConfig IE if provided and the PUSCH is scheduled by DCI format 0_1 or by a PUSCH transmission with a configured grant;

$N_{ID}^{0} \in \{0, 1, \ldots, 65535\}$ is given by the higher-layer parameter scramblingID0 in the DMRS-UplinkConfig IE if provided and the PUSCH is scheduled by DCI format 0_0 with the CRC scrambled by C-RNTI, MCS-C-RNTI, or CS-RNTI;

$N_{ID}^{n_{SCID}} = N_{ID}^{cell}$ otherwise;

$\bar{n}_{SCID}^{\lambda}$ is given by $$\bar{n}_{SCID}^{\lambda} = \begin{cases} n_{SCID} & \lambda = 0 \text{ or } \lambda = 2 \\ 1 - n_{SCID} & \lambda = 1 \end{cases}$$

if the higher-layer parameter DMRSuplink-r16 in the DMRS-UplinkConfig IE is provided, otherwise by $\bar{n}_{SCID}^{\lambda} = n_{SCID}$ $\lambda$ is the CDM group defined in clause 6.4.1.1.3 of 3GPP Technical Specification (TS) 38.213.

In NR Rel-16, two different DM-RS types are supported, namely Type-1 and Type-2 DM-RS which are shown in FIG. 1.

For the single symbol case, Type 1 DMRS uses a comb-2 structure with 2 code-division multiplexing (CDM)-Groups and length-2 FD-OCC per pair of alternating REs in each CDM-Group, while Type 2 DMRS uses a comb-3 structure with 3 CDM-Groups and length-2 FD-OCC per pair of adjacent REs in each CDM-Group. The length-2 FD-OCC is given by [1 1, 1 −1]. For the two-symbol case, time domain OCC is used to multiplex ports across the two DM-RS symbols.

Due to constant amplitude of DM-RS sequence in the frequency domain, the auto-correlation properties of the sequence in time domain is perfect. However, the power efficiency of the corresponding reference signals is limited due to relatively high PAPR.

In this disclosure we propose downlink and uplink DM-RS design based on low PAPR pi/2 BPSK modulation using DFT-S-OFDM waveform. The proposed DM-RS design also supports comb structure with every 2nd subcarrier used, for efficient multiplexing of the multiple DM-RS antenna ports.

The proposed design provides higher power efficiency and good channel estimation properties compared to DM-RS design in Rel-16 NR.

For NR operation above 52.4 GHz, especially for discrete Fourier transform spread OFDM (DFT-S-OFDM) waveform used in both downlink and uplink for power efficient transmissions, in one embodiment of this disclosure, a resource structure with 16 subcarriers or resource elements per PRB can be considered as shown in the following figure.

DM-RS Signal Generation and Mapping

For the proposed time-frequency resource grid, restricted resource allocation sizes of $2^{\alpha}$ PRBs is allowed where $\alpha=1, 2, 3 \ldots$ For such a resource structure, a new DM-RS design is proposed with a common sequence for all modulations. In one embodiment, the DM-RS sequence is generated as shown in FIG. 3. The DM-RS is defined as a pre-DFT time domain binary sequence $b(i)$, $i=0, 1, 2, \ldots, L-1$, where $L=2^{\alpha}$. The binary sequence $b(i)$ is then modulated by $\pi/2$-BPSK according to $$d(i) = \frac{e^{j\frac{\pi}{2}(i \bmod 2)}}{\sqrt{2}}[(1-2b(i))+j(1-2b(i))]$$

where $d(i)$ is a $\pi/2$-BPSK sequence of the same length L. The sequence is then multiplied with TD-OCC for port multiplexing and DFT-spread using an N-Point DFT where the DFT length N=2L. The frequency domain complex sequence is then mapped to the subcarriers in a comb structure following Type 1 mapping defined in 5G NR Rel-16 as shown in FIG. 4.

In one embodiment, the 2 CDM groups shown in FIG. 4 can each support 2 orthogonal DM-RS ports which are separated using pre-DFT time domain OCC. The DM-RS mapping enables the use of 4 orthogonal DM-RS ports in total as shown in the following Table 1.

TABLE 1

| DMRS Port Number | CDM Group | DMRS Sequence in Time domain (2L-Point DFT) |
| --- | --- | --- |
| 0 | 0 | [d d]; d = d(0), d(1), ..., d(L − 1) |
| 1 | | $[\tilde{d}\ \tilde{d}]$; $\tilde{d}$ = [1 −1 1 −1 ...] ⊙ d <br> = d(0), −d(1), d(2), −d(3), ..., $(-1)^{L-1}d(L-1)$ |
| 2 | 1 | $[d\ d]e^{j\pi i/L}$, i = 0, 1, ..., 2L − 1 <br> d = d(0), d(1), ..., d(L − 1) |

TABLE 1-continued

| DMRS Port Number | CDM Group | DMRS Sequence in Time domain (2L-Point DFT) |
|---|---|---|
| 3 | | $[d\ d]e^{\frac{j\pi i}{L}}, i=0, 1, \ldots, 2L-1; \tilde{d} = [1\ -1\ 1\ -1\ \ldots\ ] \odot d$ <br> $\tilde{d} = d(0), -d(1), \ldots, (-1)^{L-1}d(L-1)$ |

Within a CDM group, port multiplexing is achieved by symbol-level length—L TD-OCC pair [1 1 1 1 . . . ], [1 −1 1 −1 . . . ] and the comb mapping can be achieved by pre-DFT time domain repetition. The $2^{nd}$ CDM group is generated by using a time domain linear phase ramp which is equivalent to a one subcarrier frequency domain cyclic shift.

In other embodiments, port multiplexing is achieved by reverting signals, exchanging the mapping to DFT-s-OFDM symbols and changing the sign of one signal corresponding to one of DFT-s-OFDM symbol. For example, if the signals corresponding to one DMRS port transmitted on two DFT-s-OFDM symbols are denoted as $a=[a_0, a_1, \ldots, a_{L-1}]$ and $b=[b_0, b_1, \ldots, b_{L-1}]$. Then the signals for the same DFT-s-OFDM symbols corresponding to another DMRS port are obtained as $c=[b_L, b_{L-1}, \ldots, b_0]$ for the $1^{st}$ DFT-s-OFDM symbol and as $d=[-a_L, -a_{L-1}, \ldots, -a_0]$ for the $2^{nd}$ DFT-s-OFDM symbol. In another example of this embodiment the signals for the same DFT-s-OFDM symbols corresponding to another DMRS port are obtained as $c=[-b_L, -b_{L-1}, \ldots, -b_0]$ for the $1^{st}$ DFT-s-OFDM symbol and as $d=[a_L, a_{L-1}, \ldots, a_0]$ for the $2^{nd}$ DFT-s-OFDM symbol. The examples of this embodiment are illustrated in FIG. 5.

DM-RS Sequence Generation: Complementary Sequences

In one embodiment, the binary DM-RS sequence is based on a Golay Complementary pair of length 8 wherein two binary sequences a(i), b(i) are selected such that the sum of their normalized cyclic autocorrelation functions $R_a$, $R_b$ yields ideal autocorrelation e.g., $$R_a(j) + R_b(j) = \begin{cases} 1, j=0 \\ 0, j \neq 0 \end{cases}$$

In another embodiment, the normalized cyclic autocorrelation is calculated after modulation with π/2-BPSK and the sum still has ideal autocorrelation properties.

In one embodiment, the two complementary sequences a(i), b(i) are chosen from a set of 15 complementary sequences given in Table 2.

TABLE 2

| # | $1^{st}$ Sequence-a(i) | $2^{nd}$ Sequence-b(i) |
|---|---|---|
| 0 | 1 0 0 1 1 1 1 1 | 1 0 1 0 0 1 1 |
| 1 | 0 1 0 1 0 0 1 1 | 1 0 0 1 1 1 1 1 |
| 2 | 0 0 0 0 1 0 0 1 | 1 1 0 0 0 1 0 1 |
| 3 | 1 1 0 0 0 1 0 1 | 1 1 0 0 0 0 1 1 1 0 0 1 |
| 4 | 0 1 1 0 1 1 1 1 | 1 0 1 0 0 0 1 1 |
| 5 | 1 0 0 0 1 0 1 0 | 1 1 1 1 0 1 |
| 6 | 0 1 1 1 1 1 0 1 | 0 0 0 1 1 0 1 |
| 7 | 1 1 1 0 1 1 0 1 | 0 0 0 1 1 1 0 1 |
| 8 | 0 0 1 1 0 1 0 1 | 1 1 1 1 0 0 1 |
| 9 | 1 1 1 1 0 0 1 0 | 0 0 1 0 1 0 1 |
| 10 | 0 1 0 0 0 0 0 1 | 1 1 0 1 1 0 0 0 1 |
| 11 | 1 0 1 0 1 0 1 1 | 1 0 0 0 1 1 1 |

TABLE 2-continued

Complementary DM-RS Sequence Pairs

| # | $1^{st}$ Sequence-a(i) | $2^{nd}$ Sequence-b(i) |
|---|---|---|
| 12 | 1 0 1 1 0 0 0 1 | 0 1 0 0 0 0 0 1 |
| 13 | 0 0 1 0 0 1 1 1 | 1 1 0 1 0 1 1 1 |
| 14 | 0 1 1 1 0 1 1 1 | 1 0 0 0 1 0 1 1 |

In one embodiment, the resource mapping of the complementary DM-RS sequences is done on two adjacent DM-RS symbols wherein, the port multiplexing follows the aforementioned TD-OCC, repetition and linear phase ramp based approach within each symbol. The sequence a(i) is used in the first DM-RS symbol and the sequence b(i) is used in the second DM-RS symbol. The mapping is illustrated in FIG. 6.

In one embodiment, both CDM groups use the same sequence pair from Table 2. In another embodiment, each CDM group uses a different sequence pair.

In yet another embodiment, intra and inter-slot complimentary sequence pair group hopping is supported wherein the sequence pair group number is given by group $u = (f_{gh} + n_{ID}^{RS}) \mod 30$, where $n_{ID}^{RS}$ is given by $n_{ID}^{RS} = n_{ID}^{PUSCH}$ if $n_{ID}^{PUSCH}$ is configured by the higher-layer parameter nPUSCH-Identity in the DMRS-UplinkConfig IE and the PUSCH is neither scheduled by RAR UL grant nor scheduled by DCI format 0_0 with CRC scrambled by TC-RNTI according to clause 8.3 in [5, TS 38.213];

$n_{ID}^{RS} = n_{ID}^{PUSCH}$ if $n_{ID}^{PUSCH} = N_{ID}^{nSCID}$, π/2-BPSK modulation is used for PUSCH, and the PUSCH transmission is not a msg3 transmission;

$n_{ID}^{RS} = N_{ID}^{cell}$ otherwise where $f_{gh}$ and the sequence number v are given by:
if neither group, nor sequence hopping is enabled
$f_{gh} = 0$
$v = 0$
if group hopping is enabled and sequence hopping is disabled $$f_{gh} = (\Sigma_{m=0}^{7} 2^m c(8(N_{symb}^{slot} n_{s,f}^{\mu} + l') + m)) \mod 15$$

$v = 0$ where the pseudo-random sequence c(i) is defined by clause 5.2.1 in 3GPP TS 38.211 and shall be initialized with $c_{init} = \lfloor n_{ID}^{RS}/30 \rfloor$ at the beginning of each radio frame and l' is the OFDM symbol number within the slot of the first DM-RS symbol of the DM-RS symbol pair where the complementary sequence pair is mapped.

Sequence Set Extensions to Larger Lengths

Sequence set extensions to larger lengths using the length-8 sequence pairs is possible using either concatenation or interleaving wherein both methods preserve the ideal autocorrelation properties of the sequence pair.

In one embodiment, larger DM-RS sequences are obtained using concatenation of length L sequences:

$$\{a^{2L}(i), a^{2L}(i+L)\} = \{a^L(i), b^L(i)\}$$

$$\{b^{2L}(i), b^{2L}(i+L)\} = \{a^L(i), \bar{b}^L(i)\}$$

$$i = 0, \ldots, L-1$$

The concatenated extension method is illustrated in FIG. 7A.

In one embodiment, larger DM-RS sequences are obtained using interleaving of length L sequences:

$$\{a^{2L}(2i), a^{2L}(2i+1)\} = \{a^L(i), b^L(i)\}$$

$$\{b^{2L}(2i), b^{2L}(2i+1)\} = \{a^L(i), \bar{b}^L(i)\}$$

$$i = 0, \ldots, L-1$$

The interleaved extension method is illustrated in FIG. 7B.

In one embodiment, if a resource allocation length of $2^\alpha$ PRBs are used wherein each PRB has 16 subcarriers and uses Type 1 mapping for DM-RS e.g., each PRB has 8 DM-RS subcarriers for any baseband DM-RS antenna port, the sequence extension is performed a number of iterations starting with a base sequence pair of length-8 to obtain the appropriate sequence length for $2^\alpha$ PRBs.

CSI-RS and SRS Embodiments

5G NR supports set of the reference signals. CSI-RS is used in DL to facilitate measurement for DL channel. In particular, CSI-RS can be configured to measure reference signal received power (RSRP) in mobility and beam measurement/selection procedures, CSI (CRI, CQI, PMI, RI and LI) to assist link adaptation and precoding for DL at the gNB. CSI-RS can be also configured for time and frequency tracking purpose to improve demodulation performance via estimation of large scale statistics such as average delay, Doppler shift, delay spread and Doppler spread.

CSI-RS in Rel-16 NR is defined in the frequency domain by QPSK modulated by PN sequence obtained from length-31 Gold code generator. The Gold code generator for PN sequence is initialized at the start of each OFDM symbol using the following seed:

$$c_{init} = (2^{10}(N_{symb}^{slot} n_{s,f}^\mu + l + 1)(2n_{ID} + 1) + n_{ID}) \bmod 2^{31}$$

where $n_{s,f}^\mu$ is the slot number within a radio frame, l is the OFDM symbol number within a slot, and $n_{ID}$ equals the higher-layer parameter scramblingID or sequenceGenerationConfig. It should be noted that the sequence depends on the OFDM symbol number, where CSI-RS is transmitted. The QPSK modulated sequence is mapped to the resource elements allocated for CSI-RS transmission.

Similar to CSI-RS, SRS is used to support beam management and link adaptation for UL. SRS is transmitted from the UE to gNB. To provide low PAPR, SRS is modulated by Zadoff-Chu sequence modulating resource elements in the frequency domain. Zadoff-chu sequence is defined by the sequence length, root and cyclic shift of the sequence. For more efficient multiplexing SRS is transmitted on every $2^{nd}$ or $4^{th}$ subcarriers.

Due to constant amplitude of CSI-RS and SRS sequence in the frequency domain the auto-correlation properties of the sequence in time domain is perfect. However the power efficiency of the corresponding reference signals are limited due to relatively high PAPR.

Embodiments herein provide CSI-RS and SRS design based on low PAPR pi/2 BPSK modulation. The proposed CSI-RS and SRS design also supports comb structure with every 2nd or 4th subcarrier used, for efficient multiplexing of the multiple CSI-RS or SRS antenna ports.

The described signal design provide higher power efficiency comparing to CSI-RS and SRS design Rel-16 NR.

In some embodiments, the CSI-RS and SRS is obtained from PN sequence generated from length-31 Gold code. The initial state of the generator is set according to the following equation:

$$c_{init} = (2^{10}(N_{symb}^{slot} n_{s,f}^\mu + l + 1)(2n_{ID} + 1) + n_{ID}) \bmod 2^{31}$$

where $n_{s,f}^\mu$ is the slot number within a radio frame, l is the OFDM symbol number within a slot, and $n_{ID}$ equals the higher-layer parameter scramblingID or sequenceGenerationConfig. The OFDM symbol used to obtain initial state for PN generator may be the same for all CSI-RS or SRS signals/resources in the CSI-RS or SRS resource set and set according to the earliest OFDM symbol.

For the L allocated PRBs for CSI-RS or SRS transmission, the PN binary sequence b(i) of length L is obtained and modulated to sequence d(i) using pi/2 BPSK modulation according to the following expression:

$$d(i) = \frac{e^{j\frac{\pi}{2}(i \bmod 2)}}{\sqrt{2}}[(1 - 2b(i)) + j(1 - 2b(i))]$$

In the other embodiment, the sequence b(i) of length L/P is generated, where P is positive integer even value, e.g. P=2, 4, and modulated by pi/2 BPSK to d(i) sequence of the same length L/P. After modulation, the sequence d(i) is repeated P times to create comb structure.

To facilitate CSI-RS and SRS transmission on other combs, the sequence after repetition is multiplied by group level cover code wi. In particular, for P=2, two cover codes w0 and w1 are defined, where the first cover code and second cover code is defined according to FIG. 8A.

Figure 8B:
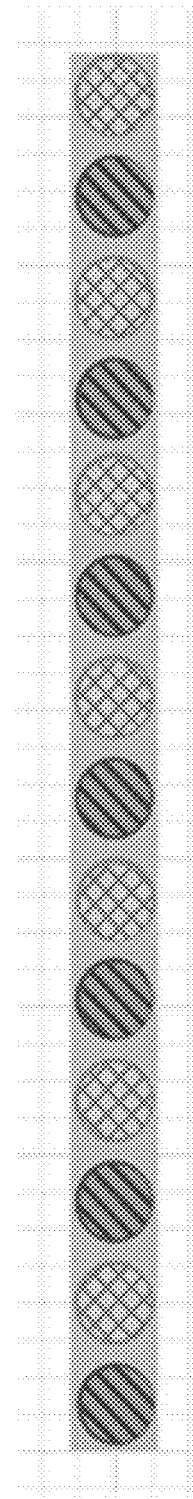
FIG. 8B illustrates channel state information reference signal (CSI-RS) and sounding reference signal (SRS) structure in frequency domain for two cover codes, in accordance with various embodiments.

The structure of CSI-RS and SRS for the sequences corresponding to cover codes w0 and w1 is shown in FIG. 8B.

The advantage of using cover code as shown in FIG. 8A is that it retain pi/2 BPSK structure of CSI-RS and SRS and, therefore, keep PAPR at low levels.

Figure 8C:
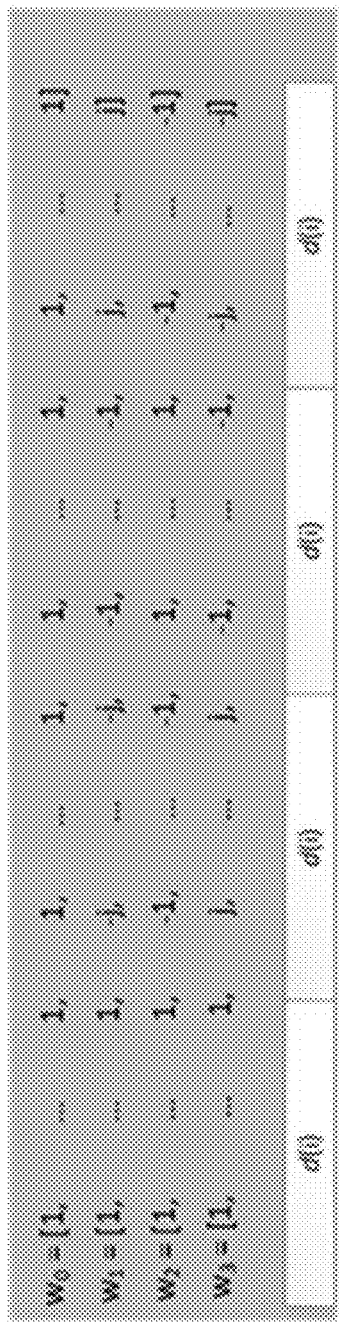
FIG. 8C illustrates time-domain repetition with P=4 and group-level cover code, in accordance with various embodiments.

For P=4, four cover codes are defined w0, w1, w2, w3 according to FIG. 8C.

Figure 8D:
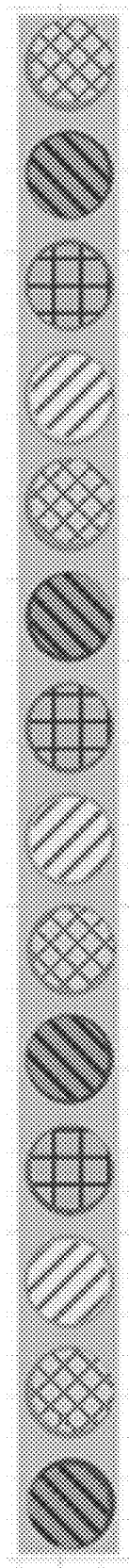
FIG. 8D illustrates CSI-RS and SRS structure in frequency domain for four cover codes, in accordance with various embodiments.

The structure of CSI-RS and SRS for the sequences corresponding to cover codes w0 and w1 is shown in FIG. 8D.

Pulse shaping filter can be applied for CSI-RS and SRS transmissions to further improve PAPR performance and therefore power efficiency of the corresponding reference signal.

Systems and Implementations

Figure 9:
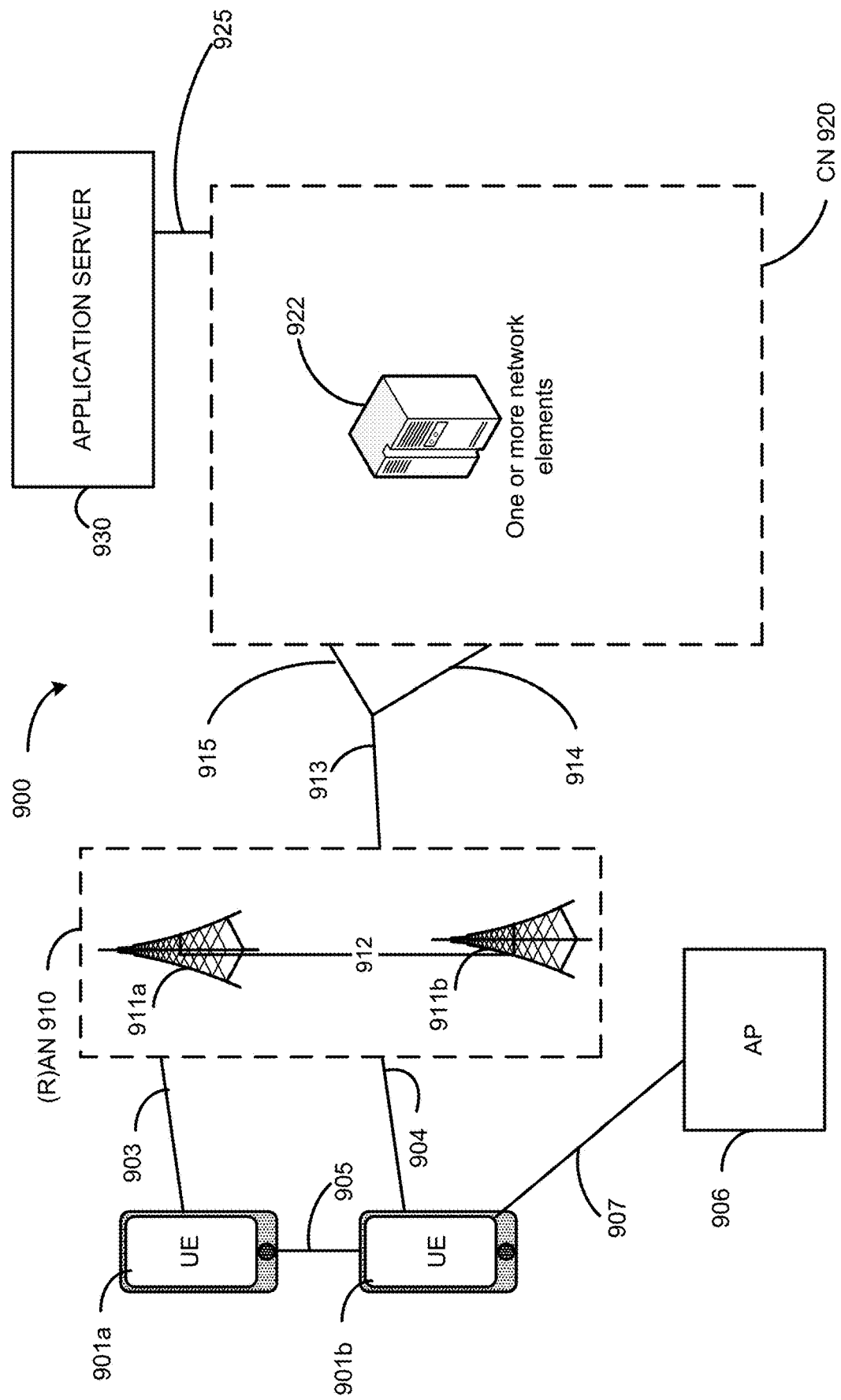
FIG. 9 illustrates an example architecture of a system of a network, in accordance with various embodiments.

FIG. 9 illustrates an example architecture of a system 900 of a network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 901a and UE 901b (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with an or RAN 910. In embodiments, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901b is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 802.11 protocol, wherein the AP 906 would comprise a wireless fidelity (Wi-Fi®) router. In this example, the AP 906 is shown to be connected to the Internet without connecting to the core network of the wireless system (described in further detail below). In various embodiments, the UE 901b, RAN 910, and AP 906 may be configured to utilize LWA operation and/or LWIP operation. The LWA operation may involve the UE 901b in RRC_CONNECTED being configured by a RAN node 911a-b to utilize radio resources of LTE and WLAN. LWIP operation may involve the UE 901b using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911a and 911b (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various embodiments, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 911 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 911; a MAC/PHY split wherein RRC, PDCP, RLC, and MAC layers are operated by the CRAN/vBBUP and the PHY layer is operated by individual RAN nodes 911; or a "lower PHY" split wherein RRC, PDCP, RLC, MAC layers and upper portions of the PHY layer are operated by the CRAN/vBBUP and lower portions of the PHY layer are operated by individual RAN nodes 911. This virtualized framework allows the freed-up processor cores of the RAN nodes 911 to perform other virtualized applications. In some implementations, an individual RAN node 911 may represent individual gNB-DUs that are connected to a gNB-CU via individual F1 interfaces (not shown by FIG. 9). In these implementations, the gNB-DUs may include one or more remote radio heads or RFEMs (see, e.g., FIG. 10), and the gNB-CU may be operated by a server that is located in the RAN 910 (not shown) or by a server pool in a similar manner as the CRAN/vBBUP. Additionally or alternatively, one or more of the RAN nodes 911 may be next generation eNBs (ng-eNBs), which are RAN nodes that provide E-UTRA user plane and control plane protocol terminations toward the UEs 901, and are connected to a 5GC via an NG interface (discussed infra).

In V2X scenarios one or more of the RAN nodes 911 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 901 (vUEs 901). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 911 can terminate the air interface protocol and can be the first point of contact for the UEs 901. In some embodiments, any of the RAN nodes 911 can fulfill various logical functions for the RAN 910 including, but not limited to, radio network controller (RNC) functions such as radio bearer management, uplink and downlink dynamic radio resource management and data packet scheduling, and mobility management.

In embodiments, the UEs 901 can be configured to communicate using OFDM communication signals with each other or with any of the RAN nodes 911 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 to the UEs 901, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901b within a cell) may be performed at any of the RAN nodes 911 based on channel quality information fed back from any of the UEs 901. The downlink resource assignment information may be sent on the PDCCH used for (e.g., assigned to) each of the UEs 901.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 911 may be configured to communicate with one another via interface 912. In embodiments where the system 900 is an LTE system (e.g., when CN 920 is an EPC), the interface 912 may be an X2 interface 912. The X2 interface may be defined between two or more RAN nodes 911 (e.g., two or more eNBs and the like) that connect to EPC 920, and/or between two eNBs connecting to EPC 920. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 901 from an SeNB for user data; information of PDCP PDUs that were not delivered to a UE 901; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 900 is a 5G or NR system (e.g., when CN 920 is an 5GC), the interface 912 may be an Xn interface 912. The Xn interface is defined between two or more RAN nodes 911 (e.g., two or more gNBs and the like) that connect to 5GC 920, between a RAN node 911 (e.g., a gNB) connecting to 5GC 920 and an eNB, and/or between two eNBs connecting to 5GC 920. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 901 in a connected mode (e.g., CM-CONNECTED) including functionality to manage the UE mobility for connected mode between one or more RAN nodes 911. The mobility support may include context transfer from an old (source) serving RAN node 911 to new (target) serving RAN node 911; and control of user plane tunnels between old (source) serving RAN node 911 to new (target) serving RAN node 911. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 910 is shown to be communicatively coupled to a core network—in this embodiment, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 930 may be an element offering applications that use IP bearer resources with the core network (e.g., UMTS PS domain, LTE PS data services, etc.). The application server 930 can also be configured to support one or more communication services (e.g., VoIP sessions, PTT sessions, group communication sessions, social networking services, etc.) for the UEs 901 via the EPC 920.

In embodiments, the CN 920 may be a 5GC (referred to as "5GC 920" or the like), and the RAN 910 may be connected with the CN 920 via an NG interface 913. In embodiments, the NG interface 913 may be split into two parts, an NG user plane (NG-U) interface 914, which carries traffic data between the RAN nodes 911 and a UPF, and the S1 control plane (NG-C) interface 915, which is a signaling interface between the RAN nodes 911 and AMFs.

In embodiments, the CN 920 may be a 5G CN (referred to as "5GC 920" or the like), while in other embodiments, the CN 920 may be an EPC). Where CN 920 is an EPC (referred to as "EPC 920" or the like), the RAN 910 may be connected with the CN 920 via an S1 interface 913. In embodiments, the S1 interface 913 may be split into two parts, an S1 user plane (S1-U) interface 914, which carries traffic data between the RAN nodes 911 and the S-GW, and the S1-MME interface 915, which is a signaling interface between the RAN nodes 911 and MMES.

Figure 10:
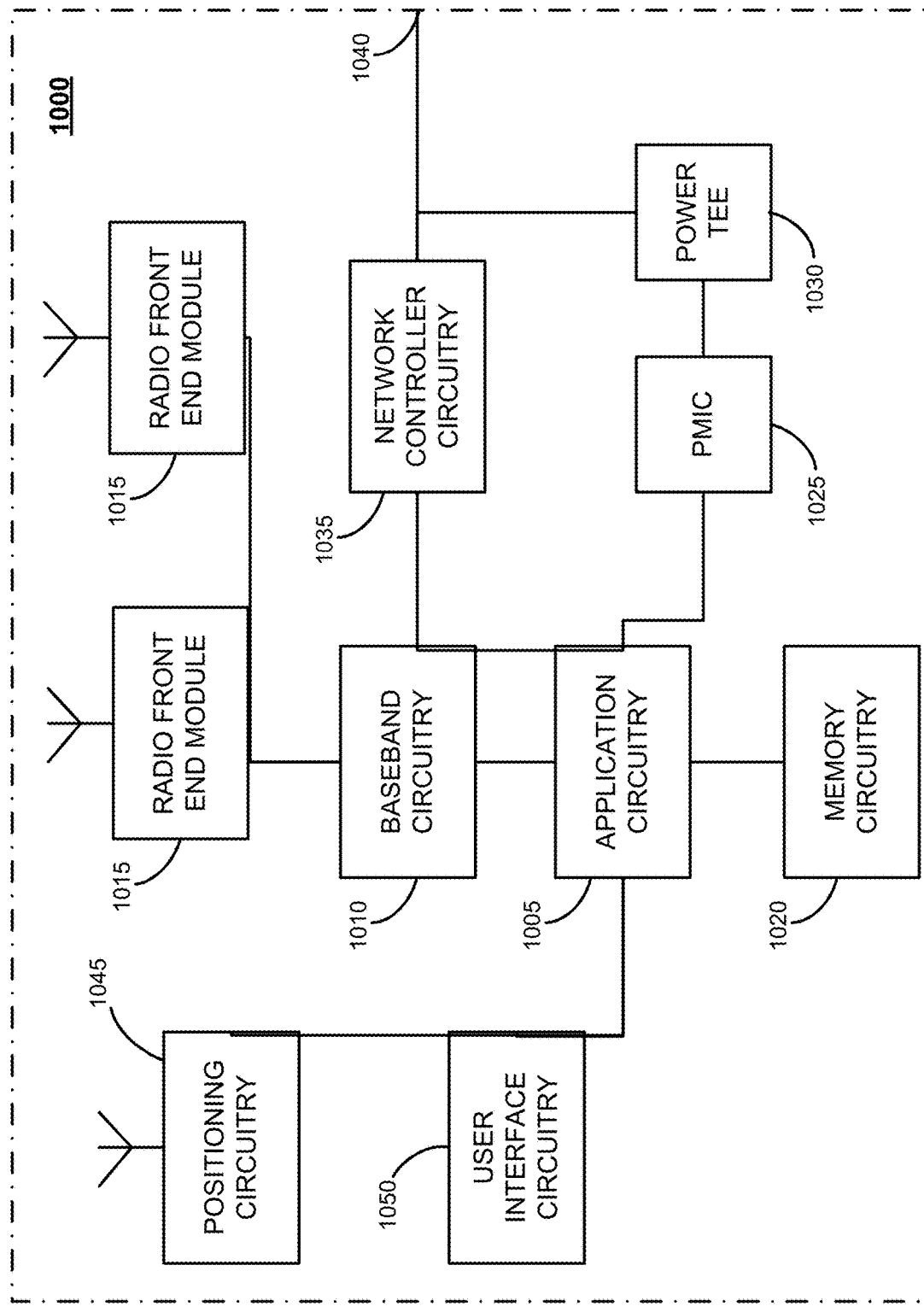
FIG. 10 illustrates an example of infrastructure equipment in accordance with various embodiments.

FIG. 10 illustrates an example of infrastructure equipment 1000 in accordance with various embodiments. The infrastructure equipment 1000 (or "system 1000") may be implemented as a base station, radio head, RAN node such as the RAN nodes 911 and/or AP 906 shown and described previously, application server(s) 930, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some embodiments, the device 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

In some implementations, the application circuitry 1005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 12.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1020 may be implemented as one or more of solder down packaged integrated circuits, socketed memory modules and plug-in memory cards.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the baseband circuitry 1010 and/or RFEMs 1015 to communicate with the nodes and components of the positioning network. The positioning circuitry 1045 may also provide position data and/or time data to the application circuitry 1005, which may use the data to synchronize operations with various infrastructure (e.g., RAN nodes 911, etc.), or the like.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 11:
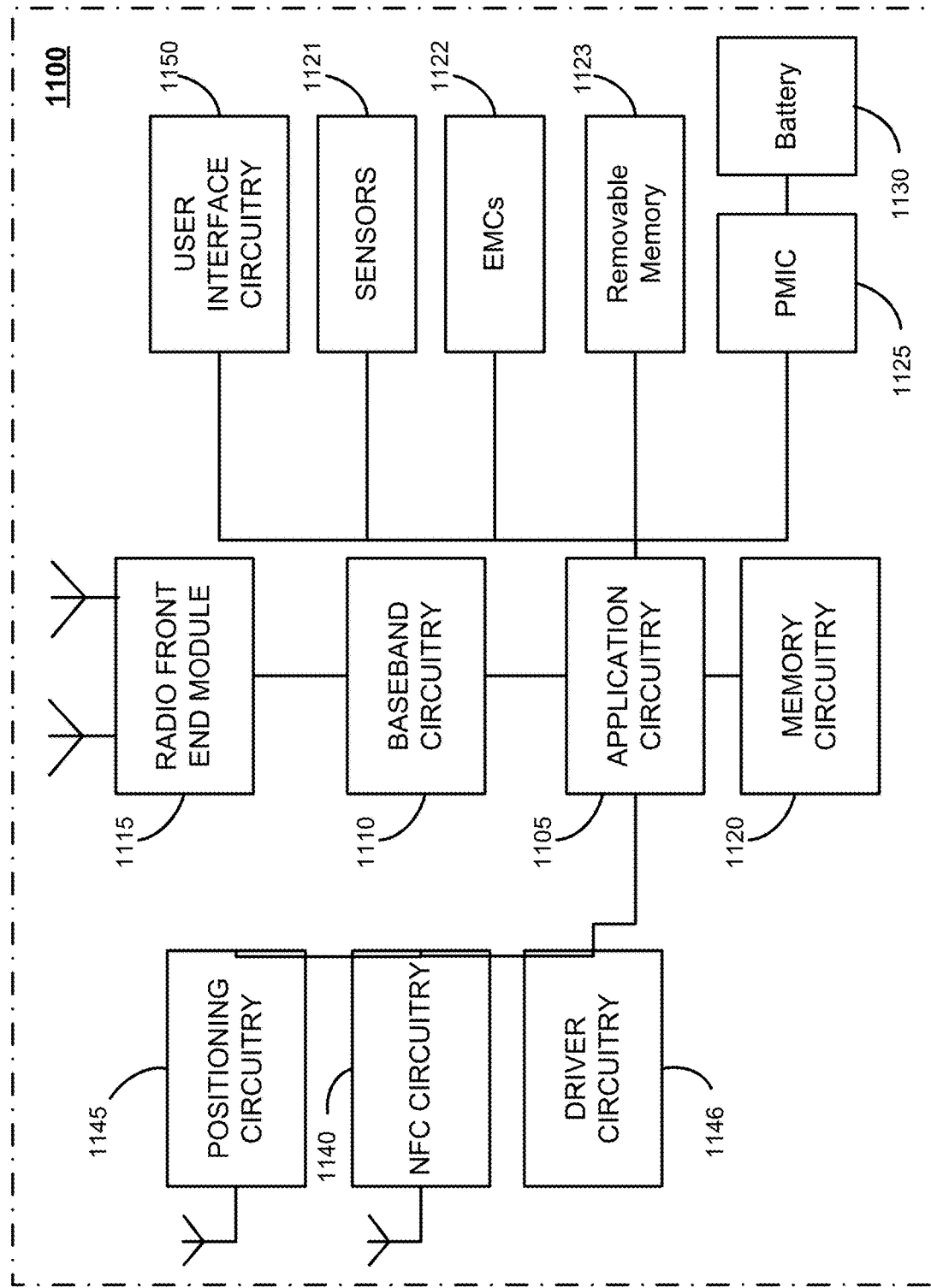
FIG. 11 illustrates an example of a computer platform in accordance with various embodiments.

FIG. 11 illustrates an example of a platform 1100 (or "device 1100") in accordance with various embodiments. In embodiments, the computer platform 1100 may be suitable for use as UEs 901, application servers 930, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1105 may comprise, or may be, a special-purpose processor/controller to operate according to the various embodiments herein.

As examples, the processor(s) of application circuitry 1105 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 1105 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package, such as the Edison™ or Galileo™ SoC boards from Intel® Corporation.

Additionally or alternatively, application circuitry 1105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric, and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1110 are discussed infra with regard to FIG. 12.

The RFEMs 1115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 may include any number and type of memory devices used to provide for a given amount of system memory. As examples, the memory circuitry 1120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1120 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1120 may be on-die memory or registers associated with the application circuitry 1105. To provide for persistent storage of information such as data, applications, operating systems and so forth, memory circuitry 1120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1100 may incorporate the three-dimensional (3D) cross-point (XPOINT) memories from Intel® and Micron®.

Removable memory circuitry 1123 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

The sensor circuitry 1121 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1122 include devices, modules, or subsystems whose purpose is to enable platform 1100 to change its state, position, and/or orientation, or move or control a mechanism or (sub)system. Additionally, EMCs 1122 may be configured to generate and send messages/signalling to other components of the platform 1100 to indicate a current state of the EMCs 1122. Examples of the EMCs 1122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1122 based on one or more captured events and/or instructions or control signals received from a service provider and/or various clients.

In some implementations, the interface circuitry may connect the platform 1100 with positioning circuitry 1145. The positioning circuitry 1145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1145 may include a Micro-PNT IC that uses a master timing clock to perform position tracking/estimation without GNSS assistance. The positioning circuitry 1145 may also be part of, or interact with, the baseband circuitry 1010 and/or RFEMs 1115 to communicate with the nodes and components of the positioning network. The positioning circuitry 1145 may also provide position data and/or time data to the application circuitry 1105, which may use the data to synchronize operations with various infrastructure (e.g., radio base stations), for turn-by-turn navigation applications, or the like In some implementations, the interface circuitry may connect the platform 1100 with Near-Field Communication (NFC) circuitry 1140. NFC circuitry 1140 is configured to provide contactless, short-range communications based on radio frequency identification (RFID) standards, wherein magnetic field induction is used to enable communication between NFC circuitry 1140 and NFC-enabled devices external to the platform 1100 (e.g., an "NFC touchpoint"). NFC circuitry 1140 comprises an NFC controller coupled with an antenna element and a processor coupled with the NFC controller. The NFC controller may be a chip/IC providing NFC functionalities to the NFC circuitry 1140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1140, or initiate data transfer between the NFC circuitry 1140 and another active NFC device (e.g., a smartphone or an NFC-enabled POS terminal) that is proximate to the platform 1100.

The driver circuitry 1146 may include software and hardware elements that operate to control particular devices that are embedded in the platform 1100, attached to the platform 1100, or otherwise communicatively coupled with the platform 1100. The driver circuitry 1146 may include individual drivers allowing other components of the platform 1100 to interact with or control various input/output (I/O) devices that may be present within, or connected to, the platform 1100. For example, driver circuitry 1146 may include a display driver to control and allow access to a display device, a touchscreen driver to control and allow access to a touchscreen interface of the platform 1100, sensor drivers to obtain sensor readings of sensor circuitry 1121 and control and allow access to sensor circuitry 1121, EMC drivers to obtain actuator positions of the EMCs 1122 and/or control and allow access to the EMCs 1122, a camera driver to control and allow access to an embedded image capture device, audio drivers to control and allow access to one or more audio devices.

The power management integrated circuitry (PMIC) 1125 (also referred to as "power management circuitry 1125") may manage power provided to various components of the platform 1100. In particular, with respect to the baseband circuitry 1110, the PMIC 1125 may control power-source selection, voltage scaling, battery charging, or DC-to-DC conversion. The PMIC 1125 may often be included when the platform 1100 is capable of being powered by a battery 1130, for example, when the device is included in a UE 901.

In some embodiments, the PMIC 1125 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

In some implementations, the battery 1130 may be a "smart battery," which includes or is coupled with a Battery Management System (BMS) or battery monitoring integrated circuitry. The BMS may be included in the platform 1100 to track the state of charge (SoCh) of the battery 1130. The BMS may be used to monitor other parameters of the battery 1130 to provide failure predictions, such as the state of health (SoH) and the state of function (SoF) of the battery 1130. The BMS may communicate the information of the battery 1130 to the application circuitry 1105 or other components of the platform 1100. The BMS may also include an analog-to-digital (ADC) convertor that allows the application circuitry 1105 to directly monitor the voltage of the battery 1130 or the current flow from the battery 1130. The battery parameters may be used to determine actions that the platform 1100 may perform, such as transmission frequency, network operation, sensing frequency, and the like.

A power block, or other power supply coupled to an electrical grid may be coupled with the BMS to charge the battery 1130. In some examples, the power block XS30 may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1150 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensor circuitry 1121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 12:
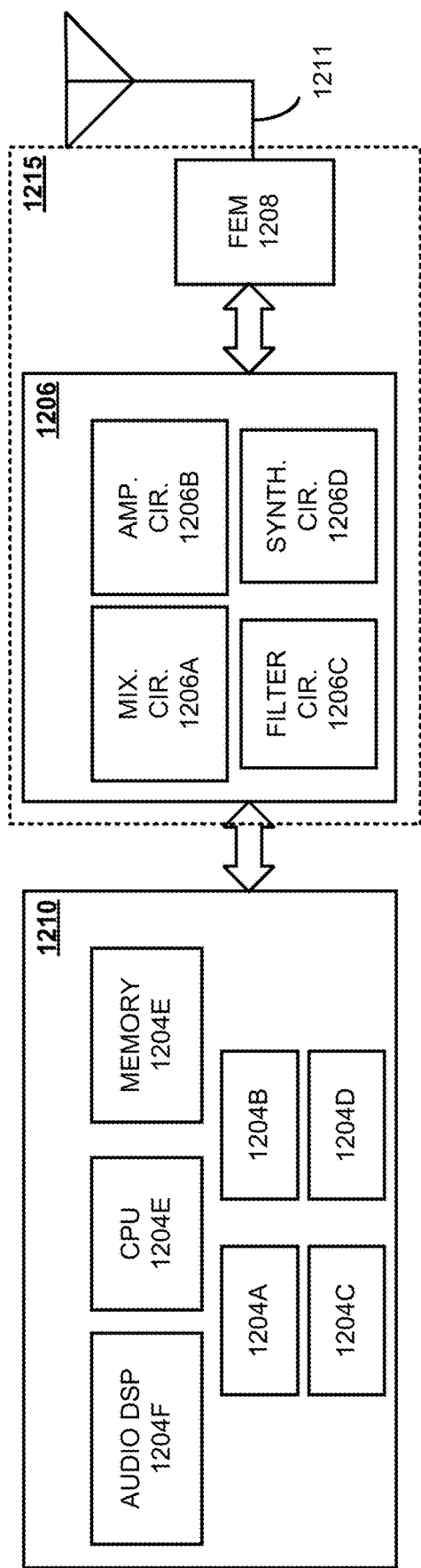
FIG. 12 illustrates example components of baseband circuitry and radio front end modules in accordance with various embodiments.

FIG. 12 illustrates example components of baseband circuitry 1210 and radio front end modules (RFEM) 1215 in accordance with various embodiments. The baseband circuitry 1210 corresponds to the baseband circuitry 1010 and 1110 of FIGS. 10 and 11, respectively. The RFEM 1215 corresponds to the RFEM 1015 and 1115 of FIGS. 10 and 11, respectively. As shown, the RFEMs 1215 may include Radio Frequency (RF) circuitry 1206, front-end module (FEM) circuitry 1208, antenna array 1211 coupled together at least as shown.

The baseband circuitry 1210 includes circuitry and/or control logic configured to carry out various radio/network protocol and radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1210 may include Fast-Fourier Transform (FFT), precoding, or constellation mapping/demapping functionality. In some embodiments, encoding/decoding circuitry of the baseband circuitry 1210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1210 is configured to process baseband signals received from a receive signal path of the RF circuitry 1206 and to generate baseband signals for a transmit signal path of the RF circuitry 1206. The baseband circuitry 1210 is configured to interface with application circuitry 1005/1105 (see FIGS. 10 and 11) for generation and processing of the baseband signals and for controlling operations of the RF circuitry 1206. The baseband circuitry 1210 may handle various radio control functions.

The aforementioned circuitry and/or control logic of the baseband circuitry 1210 may include one or more single or multi-core processors. For example, the one or more processors may include a 3G baseband processor 1204A, a 4G/LTE baseband processor 1204B, a 5G/NR baseband processor 1204C, or some other baseband processor(s) 1204D for other existing generations, generations in development or to be developed in the future (e.g., sixth generation (6G), etc.). In other embodiments, some or all of the functionality of baseband processors 1204A-D may be included in modules stored in the memory 1204G and executed via a Central Processing Unit (CPU) 1204E. In other embodiments, some or all of the functionality of baseband processors 1204A-D may be provided as hardware accelerators (e.g., FPGAs, ASICs, etc.) loaded with the appropriate bit streams or logic blocks stored in respective memory cells. In various embodiments, the memory 1204G may store program code of a real-time OS (RTOS), which when executed by the CPU 1204E (or other baseband processor), is to cause the CPU 1204E (or other baseband processor) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1210 includes one or more audio digital signal processor(s) (DSP) 1204F. The audio DSP(s) 1204F include elements for compression/decompression and echo cancellation and may include other suitable processing elements in other embodiments.

In some embodiments, each of the processors 1204A-1204E include respective memory interfaces to send/receive data to/from the memory 1204G. The baseband circuitry 1210 may further include one or more interfaces to communicatively couple to other circuitries/devices, such as an interface to send/receive data to/from memory external to the baseband circuitry 1210; an application circuitry interface to send/receive data to/from the application circuitry 1005/1105 of FIGS. 10-12); an RF circuitry interface to send/receive data to/from RF circuitry 1206 of FIG. 12; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1125.

In alternate embodiments (which may be combined with the above described embodiments), baseband circuitry 1210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (e.g., the radio front end modules 1215).

Although not shown by FIG. 12, in some embodiments, the baseband circuitry 1210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1210 and/or RF circuitry 1206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1210 and/or RF circuitry 1206 are part of a Wi-Fi communication system. In the second example, the protocol processing circuitry would operate Wi-Fi MAC and logical link control (LLC) functions. The protocol processing circuitry may include one or more memory structures (e.g., 1204G) to store program code and data for operating the protocol functions, as well as one or more processing cores to execute the program code and perform various operations using the data. The baseband circuitry 1210 may also support radio communications for more than one wireless protocol.

The various hardware elements of the baseband circuitry 1210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1210 may be suitably combined in a single chip or chipset, or disposed on a same circuit board. In another example, some or all of the constituent components of the baseband circuitry 1210 and RF circuitry 1206 may be implemented together such as, for example, a system on a chip (SoC) or System-in-Package (SiP). In another example, some or all of the constituent components of the baseband circuitry 1210 may be implemented as a separate SoC that is communicatively coupled with and RF circuitry 1206 (or multiple instances of RF circuitry 1206). In yet another example, some or all of the constituent components of the baseband circuitry 1210 and the application circuitry 1005/1105 may be implemented together as individual SoCs mounted to a same circuit board (e.g., a "multi-chip package").

In some embodiments, the baseband circuitry 1210 may provide for communication compatible with one or more radio technologies. For example, in some embodiments, the baseband circuitry 1210 may support communication with an E-UTRAN or other WMAN, a WLAN, a WPAN. Embodiments in which the baseband circuitry 1210 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path, which may include circuitry to down-convert RF signals received from the FEM circuitry 1208 and provide baseband signals to the baseband circuitry 1210. RF circuitry 1206 may also include a transmit signal path, which may include circuitry to up-convert baseband signals provided by the baseband circuitry 1210 and provide RF output signals to the FEM circuitry 1208 for transmission.

In some embodiments, the receive signal path of the RF circuitry 1206 may include mixer circuitry 1206*a*, amplifier circuitry 1206*b* and filter circuitry 1206*c*. In some embodiments, the transmit signal path of the RF circuitry 1206 may include filter circuitry 1206*c* and mixer circuitry 1206*a*. RF circuitry 1206 may also include synthesizer circuitry 1206*d* for synthesizing a frequency for use by the mixer circuitry 1206*a* of the receive signal path and the transmit signal path. In some embodiments, the mixer circuitry 1206*a* of the receive signal path may be configured to down-convert RF signals received from the FEM circuitry 1208 based on the synthesized frequency provided by synthesizer circuitry 1206*d*. The amplifier circuitry 1206*b* may be configured to amplify the down-converted signals and the filter circuitry 1206*c* may be a low-pass filter (LPF) or band-pass filter (BPF) configured to remove unwanted signals from the down-converted signals to generate output baseband signals. Output baseband signals may be provided to the baseband circuitry 1210 for further processing. In some embodiments, the output baseband signals may be zero-frequency baseband signals, although this is not a requirement. In some embodiments, mixer circuitry 1206*a* of the receive signal path may comprise passive mixers, although the scope of the embodiments is not limited in this respect.

In some embodiments, the mixer circuitry 1206*a* of the transmit signal path may be configured to up-convert input baseband signals based on the synthesized frequency provided by the synthesizer circuitry 1206*d* to generate RF output signals for the FEM circuitry 1208. The baseband signals may be provided by the baseband circuitry 1210 and may be filtered by filter circuitry 1206*c*.

In some embodiments, the mixer circuitry 1206*a* of the receive signal path and the mixer circuitry 1206*a* of the transmit signal path may include two or more mixers and may be arranged for quadrature downconversion and upconversion, respectively. In some embodiments, the mixer circuitry 1206*a* of the receive signal path and the mixer circuitry 1206*a* of the transmit signal path may include two or more mixers and may be arranged for image rejection (e.g., Hartley image rejection). In some embodiments, the mixer circuitry 1206*a* of the receive signal path and the mixer circuitry 1206*a* of the transmit signal path may be arranged for direct downconversion and direct upconversion, respectively. In some embodiments, the mixer circuitry 1206*a* of the receive signal path and the mixer circuitry 1206*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1210 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206*d* may be a fractional-N synthesizer or a fractional N/N+1 synthesizer, although the scope of the embodiments is not limited in this respect as other types of frequency synthesizers may be suitable. For example, synthesizer circuitry 1206*d* may be a delta-sigma synthesizer, a frequency multiplier, or a synthesizer comprising a phase-locked loop with a frequency divider.

The synthesizer circuitry 1206*d* may be configured to synthesize an output frequency for use by the mixer circuitry 1206*a* of the RF circuitry 1206 based on a frequency input and a divider control input. In some embodiments, the synthesizer circuitry 1206*d* may be a fractional N/N+1 synthesizer.

In some embodiments, frequency input may be provided by a voltage controlled oscillator (VCO), although that is not a requirement. Divider control input may be provided by either the baseband circuitry 1210 or the application circuitry 1005/1105 depending on the desired output frequency. In some embodiments, a divider control input (e.g., N) may be determined from a look-up table based on a channel indicated by the application circuitry 1005/1105.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path, which may include circuitry configured to operate on RF signals received from antenna array 1211, amplify the received signals and provide the amplified versions of the received signals to the RF circuitry 1206 for further processing. FEM circuitry 1208 may also include a transmit signal path, which may include circuitry configured to amplify signals for transmission provided by the RF circuitry 1206 for transmission by one or more of antenna elements of antenna array 1211. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission by one or more antenna elements of the antenna array 1211.

The antenna array 1211 comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array 1211 including one or more antenna elements (not shown). The antenna elements may be omnidirectional, direction, or a combination thereof. The antenna elements may be formed in a multitude of arranges as are known and/or discussed herein. The antenna array 1211 may comprise microstrip antennas or printed antennas that are fabricated on the surface of one or more printed circuit boards. The antenna array 1211 may be formed in as a patch of metal foil (e.g., a patch antenna) in a variety of shapes, and may be coupled with the RF circuitry 1206 and/or FEM circuitry 1208 using metal transmission lines or the like.

Processors of the application circuitry 1005/1105 and processors of the baseband circuitry 1210 may be used to execute elements of one or more instances of a protocol stack. For example, processors of the baseband circuitry 1210, alone or in combination, may be used execute Layer 3, Layer 2, or Layer 1 functionality, while processors of the application circuitry 1005/1105 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 13:
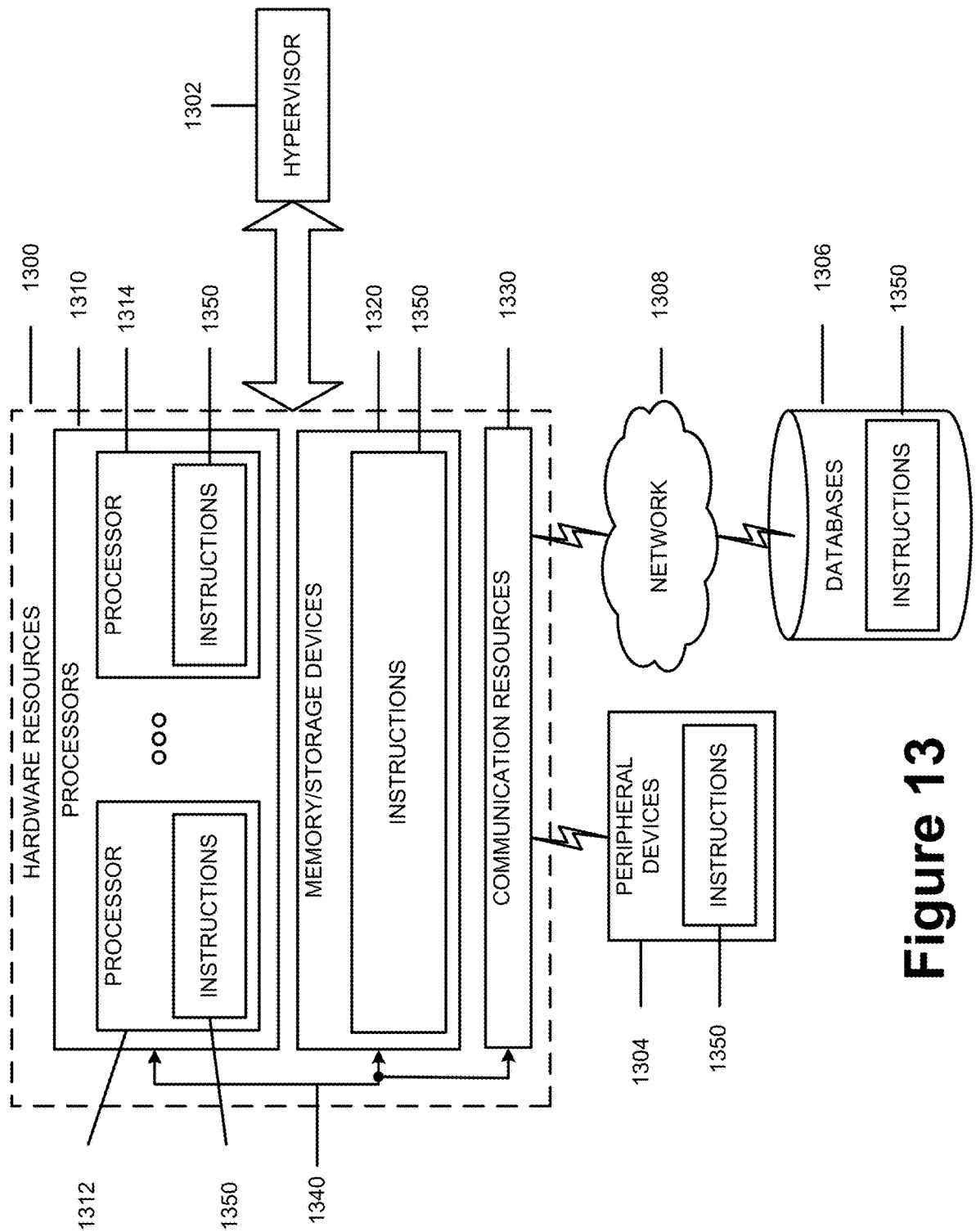
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processor(s) 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via USB), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

Example Procedures

Figure 14:
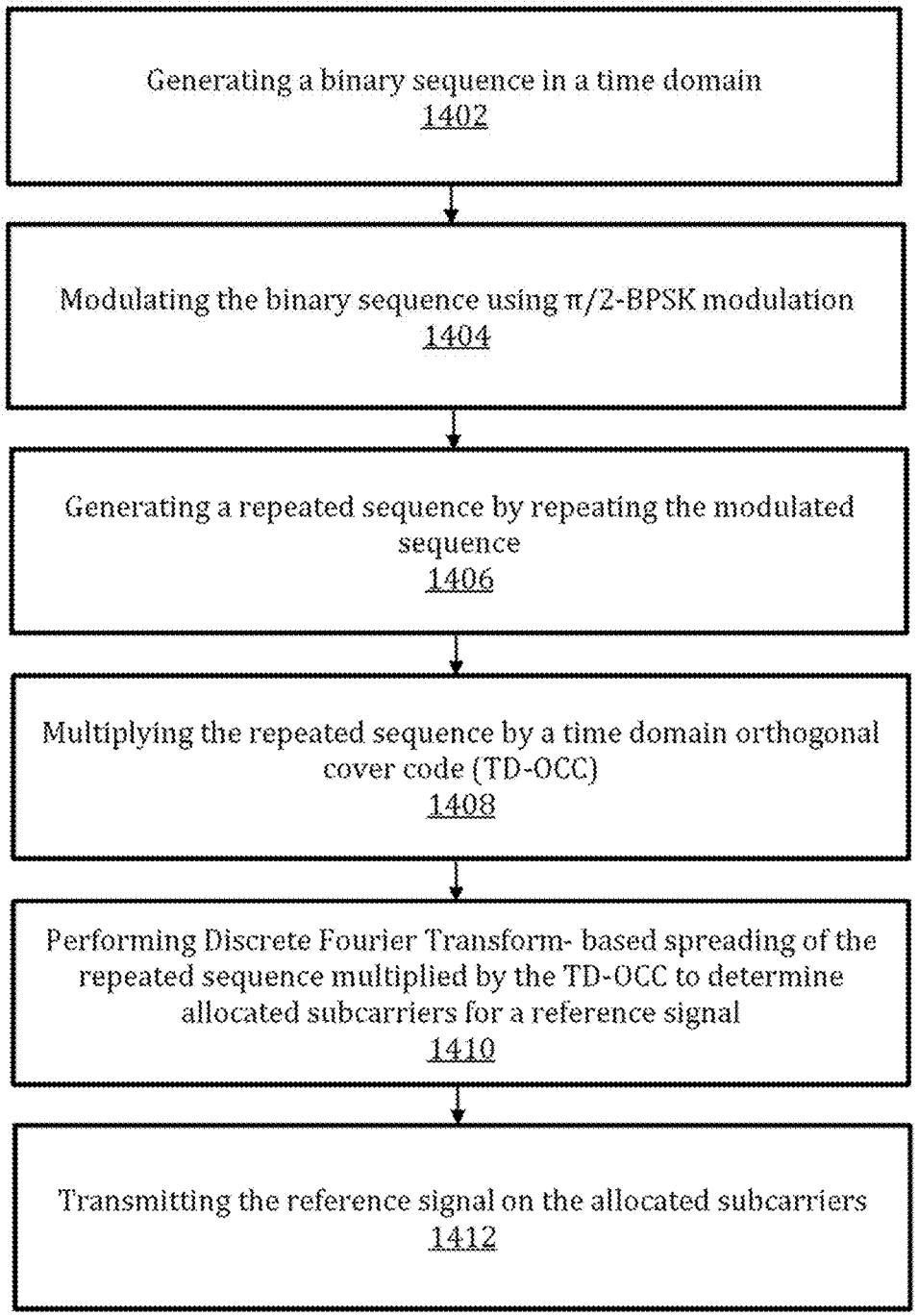
FIG. 14 is a flowchart of a process in accordance with various embodiments.

In some embodiments, the electronic device(s), network(s), system(s), chip(s) or component(s), or portions or implementations thereof, of FIGS. 9-13, or some other figure herein, may be configured to perform one or more processes, techniques, or methods as described herein, or portions thereof. One such process is depicted in FIG. 14. For example, the process may include, at 1402, generating a binary sequence in a time domain. For example, the binary sequence may be generated based on a Golay complementary property in the pre-DFT time domain.

At 1404, the process may include modulating the binary sequence using $\pi/2$-BPSK modulation. At 1406, the process may include generating a repeated sequence by repeating the modulated sequence. In some embodiments, the number of repetitions may be 2.

At 1408, the process may include multiplying the repeated sequence by a time domain orthogonal cover code (TD-OCC). In some embodiments, the TD-OCC may be a symbol-level TD-OCC.

At 1410, the process may include performing Discrete Fourier Transform-based spreading of the repeated sequence multiplied by the TD-OCC to determine allocated subcarriers for a reference signal. At 1412, the process may include transmitting the reference signal on the allocated subcarriers.

In some embodiments, the process of FIG. 14 may be performed by a gNB or a portion thereof (e.g., baseband circuitry and/or RF circuitry of the gNB).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of power efficient reference signal transmission, wherein method includes: Generation of the binary sequence based on Golay complementary property in the pre-DFT time domain; Modulation of the binary sequence according to the π/2-BPSK modulation; Repetition of the modulated sequence; Multiplication by the repeated sequence by symbol-level time domain orthogonal cover code (TD-OCC);

Discrete Fourier Transform based spreading of the modulated reference signal multiplied with TD-OCC; and Transmission of reference signal the on the allocated subcarriers.

Example 2 may include the method of example 1 or some other example herein, wherein the binary Golay complementary time domain sequence pairs are generated from the base sequence pairs of length 8 given in Table 1.

Example 3 may include the method of example 1 or some other example herein, wherein repetition is 2.

Example 4 may include the method of examples 1-3 or some other example herein, wherein complementary DM-RS sequence pairs of lengths L are generated from base sequence pairs on length 8 using systematic concatenation or interleaving.

Example 5 may include the method of example 4 or some other example herein, wherein the sequence lengths are positive non-zero powers of 2 greater than equal to 3.

Example 6 may include the method of examples 1-5 or some other example herein, wherein the first time-domain orthogonal cover code contains all 1's and the second code contains 1 for odd symbols and −1 for even symbols e.g., [1 −1 1 −1, . . . ].

Example 7 may include the method of examples 1 and 6 or some other example herein, wherein the linear phase shift is applied to each DM-RS port belonging to the 2nd CDM group (ports 2, 3) in pre-DFT time domain.

Example 8 may include the method of example 1 or some other example herein, wherein the sequence multiplied by cover code is transform precoded using DFT transform and transmitted over allocated subcarriers or allocated frequency band.

Example 9 may include the method of examples 1-8 or some other example herein, wherein two complementary DM-RS sequences are mapped on adjacent DM-RS symbols for the same baseband DM-RS port.

Example 10 may include the method of examples 1-9 or some other example herein, wherein intra and inter-slot sequence pair group hopping for DM-RS complementary pairs is supported by pseudo-random choice of sequence-pair group.

Example 11 is a method comprising: generating a binary sequence in a time domain; modulating the binary sequence using π/2-BPSK modulation; generating a repeated sequence by repeating the modulated sequence; multiplying the repeated sequence by a time domain orthogonal cover code (TD-OCC); and performing Discrete Fourier Transform-based spreading of the repeated sequence multiplied by the TD-OCC to determine allocated subcarriers for a reference signal.

Example 12 may include the method of example 11 or some other example herein, further comprising transmitting or causing transmission of the reference signal the on the allocated subcarriers.

Example 13 may include the method of example 11-12 or some other example herein, wherein the TD-OCC is a symbol-level TDD-OCC.

Example 14 may include the method of example 11-13 or some other example herein, wherein the binary sequence is generated based on a Golay complementary property in the pre-DFT time domain.

Example 15 may include the method of example 14 or some other example herein, wherein generating the binary sequence includes generating binary Golay complementary time domain sequence pairs from base sequence pairs of length 8 given in Table 2.

Example 16 may include the method of example 11 or some other example herein, wherein the repeating corresponds to 2 repetitions.

Example 17 may include the method of examples 11-16 or some other example herein, wherein the generating the binary sequence includes generating complementary DM-RS sequence pairs of lengths L from base sequence pairs on length 8 using systematic concatenation or interleaving.

Example 18 may include the method of example 17 or some other example herein, wherein the sequence lengths L are positive non-zero powers of 2 greater than or equal to 3.

Example 19 may include the method of examples 11-18 or some other example herein, wherein the multiplying by the TD-OCC includes multiplying by a first TD-OCC that contains all 1's for a first code-division multiplexing (CDM) group and multiplying by a second code that contains 1 for odd symbols and −1 for even symbols e.g., [1 −1 1 −1, . . . ] for a second CDM group.

Example 20 may include the method of examples 11-19 or some other example herein, further comprising applying a linear phase shift to each DM-RS port belonging to a 2nd CDM group (e.g., ports 2, 3) in the pre-DFT time domain.

Example 21 may include the method of example 11-20 or some other example herein, wherein the repeated sequence multiplied by the TD-OCC is transform precoded using DFT transform and transmitted over allocated subcarriers or allocated frequency band.

Example 22 may include the method of examples 11-21 or some other example herein, wherein two complementary DM-RS sequences are mapped on adjacent DM-RS symbols for the same baseband DM-RS port.

Example 23 may include the method of examples 11-22 or some other example herein, wherein intra and inter-slot sequence pair group hopping for DM-RS complementary pairs is supported by pseudo-random choice of sequence-pair group.

Example 24 may include the method of examples 11-23 or some other example herein, wherein the reference signal is transmitted in a 5G new radio (NR) Frequency Range 2 (FR2).

Example 25 may include the method of examples 11-23 or some other example herein, wherein the reference signal is transmitted at a frequency of 52.4 GHz or greater.

Example 26 may include the method of examples 11-25 or some other example herein, wherein the method is performed by a next generation Node B (gNB) or a portion thereof.

Example 27 may include a method of reference signal transmission for other antenna port, wherein the method includes: Generation of the binary sequence pair satisfying complementary property for the 1st antenna port; Modulation of the sequence according to the π/2-BPSK modulation; Modification of the modulated sequence by reverting the sequence order, exchanging the mapping to DFT-s-OFDM (Discrete Fourier Transform spreading Orthogonal Frequency Division Multiplexing) symbols and changing the sign of the sequence on one of DFT-s-OFDM symbol; DFT based spreading of the modified reference signal; and Transmission of reference signal the on the allocated subcarriers corresponding to the $2^{nd}$ antenna port.

Example 28 may include a method comprising: generating a complementary binary sequence pair for transmission of a reference signal on a first antenna port, the complementary binary sequence pair including a first binary sequence for a first Discrete Fourier Transform spreading Orthogonal Frequency Division Multiplexing (DFT-s-OFDM) symbol and a second binary sequence for a second DFT-s-OFDM symbol; modulating the complementary binary sequence pair according to π/2-BPSK modulation; modifying the complementary binary sequence pair by reversing a sequence order of the first and second binary sequences, exchanging an association between the first and second binary sequences and the first and second DFT-s-OFDM symbols, and switching a sign of one of the first or second binary sequences; and using the modified complementary binary sequence pair for transmission of the reference signal on a second antenna port.

Example 29 may include the method of example 28 or some other example herein, wherein the using the modified complementary binary sequence pair for transmission of the reference signal includes performing discrete Fourier transform (DFT) spreading of the modified complementary binary sequence pair.

Example 30 may include the method of example 28-29 or some other example herein, wherein the reference signal is transmitted in a 5G new radio (NR) Frequency Range 2 (FR2).

Example 31 may include the method of examples 28-30 or some other example herein, wherein the reference signal is transmitted at a frequency of 52.4 GHz or greater.

Example 32 may include the method of examples 28-31 or some other example herein, wherein the method is performed by a next generation Node B (gNB) or a portion thereof.

Example 33 may include a method of power efficient reference signal transmission, the method comprising: generating a binary sequence using pseudo random sequence (PN) generator; modulating the sequence according to the pi/2 BPSK modulation; repeating the modulated sequence; multiplying the repeated sequence by block level cover code; and transmitting the multiplied sequence on allocated subcarriers.

Example 34 may include the method of example 33 or some other example herein, wherein PN sequence is length 31 Gold code.

Example 35 may include the method of example 33-34 or some other example herein, wherein said repeating comprises repeating the modulated sequence with a repetition factor of 2.

Example 36 may include the method of example 33-34 or some other example herein, wherein said repeating comprises repeating the modulated sequence with a repetition factor of 4.

Example 37 may include the method of example 33 or 35 or some other example herein, wherein a first cover code includes all 1 and a second cover code includes all 1 in a first half of the second cover code and all −1 in a second half of the second cover code.

Example 38 may include the method of example 33 or 36 or some other example herein, wherein a first code includes all 1; a second cover code includes all 1 in the first quarter of the sequence, −j in the second quarter of the sequence, all −1 in the third quarter, and j in the fourth quarter of the sequence; a third cover code includes all 1 in the first quarter of the sequence, −1 in the second quarter of the sequence, all 1 in the third quarter and 1 in the fourth quarter of the sequence; a fourth cover code includes all 1 in the first quarter of the sequence, j in the second quarter of the sequence, all −1 in the third quarter and −j in the fourth quarter of the sequence Example 39 may include the method of example 33-38 or some other example herein, wherein the sequence multiplied by cover code is transmitted over allocated subcarriers or allocated frequency band Example 40 may include the method of example 33-39 or some other example herein, wherein the PN sequences is generated based on initial state of the generator set according to the following equation $$c_{init}=(2^{10}(N_{symb}^{slot}n_{s,f}^{\mu}+l+1)(2n_{ID}+1)+n_{ID}) \bmod 2^{31}$$

where $n_{s,f}^{\mu}$ is the slot number within a radio frame, l is the OFDM symbol number within a slot, and $n_{ID}$ equals the higher-layer parameter scramblingID or sequenceGenerationConfig.

Example 41 may include the method of example 40 or some other example herein, wherein the OFDM symbol used to obtain initial state is the same for all CSI-RS or SRS signals/resources in the CSI-RS or SRS resource set or group of CSI-RS or SRS resource set, wherein the OFDM symbol for initial state is set according to the earliest OFDM symbol in the set of group of the sets.

Example 42 may include the method of example 33-41 or some other example herein, wherein the CSI-RS or SRS sequences is filtered according to pulse shaping filter to minimize PAPR.

Example 43 may include the method of example 33-42 or some other example herein, wherein CSI-RS is CSI-RS for beam management, CSI-RS for tracking, CSI-RS for CSI acquisition, or CSI-RS for mobility.

Example 44 may include the method of example 33-43 or some other example herein, wherein SRS is SRS for beam management, SRS for tracking, SRS for codebook precoding, or SRS for non codebook based precoding.

Example 45 may include an apparatus comprising means to perform one or more elements of a method described in or related to any of examples 1-44, or any other method or process described herein.

Example 46 may include one or more non-transitory computer-readable media comprising instructions to cause an electronic device, upon execution of the instructions by one or more processors of the electronic device, to perform one or more elements of a method described in or related to any of examples 1-44, or any other method or process described herein.

Example 47 may include an apparatus comprising logic, modules, or circuitry to perform one or more elements of a method described in or related to any of examples 1-44, or any other method or process described herein.

Example 48 may include a method, technique, or process as described in or related to any of examples 1-44, or portions or parts thereof.

Example 49 may include an apparatus comprising: one or more processors and one or more computer-readable media comprising instructions that, when executed by the one or more processors, cause the one or more processors to perform the method, techniques, or process as described in or related to any of examples 1-44, or portions thereof.

Example 50 may include a signal as described in or related to any of examples 1-44, or portions or parts thereof.

Example 51 may include a datagram, packet, frame, segment, protocol data unit (PDU), or message as described in or related to any of examples 1-44, or portions or parts thereof, or otherwise described in the present disclosure.

Example 52 may include a signal encoded with data as described in or related to any of examples 1-44, or portions or parts thereof, or otherwise described in the present disclosure.

Example 53 may include a signal encoded with a datagram, packet, frame, segment, protocol data unit (PDU), or message as described in or related to any of examples 1-44, or portions or parts thereof, or otherwise described in the present disclosure.

Example 54 may include an electromagnetic signal carrying computer-readable instructions, wherein execution of the computer-readable instructions by one or more processors is to cause the one or more processors to perform the method, techniques, or process as described in or related to any of examples 1-44, or portions thereof.

Example 55 may include a computer program comprising instructions, wherein execution of the program by a processing element is to cause the processing element to carry out the method, techniques, or process as described in or related to any of examples 1-44, or portions thereof.

Example 56 may include a signal in a wireless network as shown and described herein.

Example 57 may include a method of communicating in a wireless network as shown and described herein.

Example 58 may include a system for providing wireless communication as shown and described herein.

Example 59 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network -continued ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell- specific Search Space
CTS Clear-to-Send
CW Codeword
CWS Contention Window Size
D2D Device-to-Device
DC Dual Connectivity, Direct Current
DCI Downlink Control Information
DF Deployment Flavour DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language, Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity GERAN
GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non- Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit - type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus -continued USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link, VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over- Internet Protocol
VPLMN Visited Public Land Mobile Network
VPN Virtual Private Network
VRB Virtual Resource Block
WiMAX Worldwide Interoperability for Microwave Access
WLANWireless Local Area Network
WMAN Wireless Metropolitan Area Network
WPANWireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause a next generation NodeB (gNB) to:
generate a complementary binary sequence pair for transmission of a reference signal on a first antenna port, wherein the complementary binary sequence pair includes a first binary sequence for transmission on a first Discrete Fourier Transform spreading Orthogonal Frequency Division Multiplexing (DFT-s-OFDM) symbol and a second binary sequence for transmission on a second DFT-s-OFDM symbol;
modulate the complementary binary sequence pair according to π/2-BPSK modulation;
generate a modified complementary binary sequence pair, wherein generation of the modified complementary binary sequence pair includes:
reversing a sequence order of the first and second binary sequences to generate a reversed first binary sequence and a reversed second binary sequence;
associating the reversed first binary sequence for transmission on the second DFT-s-OFDM symbol and associating the reversed second binary sequence for transmission on the first DFT-s-OFDM symbol; and
switching a sign of one of the reversed first binary sequence that is to be transmitted on the second DFT-s-OFDM symbol and the reversed second binary sequence that is to be transmitted on the second DFT-s-OFDM symbol; and
use the modified complementary binary sequence pair for transmission of the reference signal on a second antenna port.

2. The one or more NTCRM of claim 1, wherein to use the modified complementary binary sequence pair for transmission of the reference signal includes to perform Discrete Fourier Transform (DFT) spreading of the modified complementary binary sequence pair.

3. The one or more NTCRM of claim 1, wherein the reference signal is transmitted at a frequency of 52.4 gigahertz (GHz) or greater.

4. The one or more NTCRM of claim 1, wherein the complementary binary sequence pair is selected from a set of 15 pre-identified complementary sequences.

5. The one or more NTCRM of claim 4, wherein the first binary sequence is a(i) and the second binary sequence is b(i), and the set of 15 pre-identified complementary sequences are:

| # | 1st Sequence-a(i) | 2nd Sequence-b(i) |
|---|---|---|
| 0 | 1 0 0 1 1 1 1 1 0 1 0 | 1 0 0 1 1 |
| 1 | 0 1 0 1 0 0 1 1 1 0 0 | 1 1 1 1 1 |
| 2 | 0 0 0 0 1 0 0 1 1 1 0 | 0 0 1 0 1 |
| 3 | 1 1 0 0 0 1 0 1 0 0 0 | 0 1 0 0 1 |
| 4 | 0 1 1 0 1 1 1 1 1 0 1 | 0 0 0 1 1 |
| 5 | 1 0 0 0 1 1 0 1 0 1 1 | 1 1 1 0 1 |
| 6 | 0 1 1 1 1 0 1 1 0 0 0 | 1 1 0 1 |
| 7 | 1 1 1 0 1 1 0 1 0 0 0 | 1 1 1 0 1 |
| 8 | 0 0 1 1 0 1 0 1 1 1 1 | 1 0 0 1 |
| 9 | 1 1 1 1 1 0 0 1 0 0 1 | 1 0 1 0 1 |
| 10 | 0 1 0 0 0 0 1 1 0 1 | 1 0 0 0 1 |
| 11 | 1 0 1 0 1 1 1 0 1 0 | 0 0 1 1 1 |
| 12 | 1 0 1 1 0 0 0 1 0 1 0 | 0 0 0 0 1 |
| 13 | 0 0 1 0 0 1 1 1 1 1 0 | 1 0 1 1 1 |
| 14 | 0 1 1 1 1 0 1 1 1 0 0 | 0 1 0 1 1. |

6. The one or more NTCRM of claim 1, wherein the complementary sequence pair is related to a demodulation reference signal (DM-RS).

7. The one or more NTCRM of claim 1, wherein the sum of a first normalized cyclic autocorrelation function of the first binary sequence and a second normalized cyclic autocorrelation function of the second binary sequence yields ideal autocorrelation.

8. A base station comprising:
one or more processors; and
one or more non-transitory computer-readable media (NTCRM) having instructions, stored thereon, that when executed by one or more processors cause the base station to:
generate a complementary binary sequence pair for transmission of a reference signal on a first antenna port, wherein the complementary binary sequence pair includes a first binary sequence for transmission on a first Discrete Fourier Transform spreading Orthogonal Frequency Division Multiplexing (DFT-s-OFDM) symbol and a second binary sequence for transmission on a second DFT-s-OFDM symbol;
modulate the complementary binary sequence pair according to π/2-BPSK modulation;
generate a modified complementary binary sequence pair, wherein generation of the modified complementary binary sequence pair includes:
reversing a sequence order of the first and second binary sequences to generate a reversed first binary sequence and a reversed second binary sequence;
associating the reversed first binary sequence for transmission on the second DFT-s-OFDM symbol and associating the reversed second binary sequence for transmission on the first DFT-s-OFDM symbol; and
switching a sign of one of the reversed first binary sequence that is to be transmitted on the second DFT-s-OFDM symbol and the reversed second binary sequence that is to be transmitted on the second DFT-s-OFDM symbol; and
switching a sign of one of the first or second binary sequences; and
use the modified complementary binary sequence pair for transmission of the reference signal on a second antenna port.

9. The base station of claim 8, wherein to use the modified complementary binary sequence pair for transmission of the reference signal includes to perform Discrete Fourier Transform (DFT) spreading of the modified complementary binary sequence pair.

10. The base station of claim 8, wherein the reference signal is transmitted at a frequency of 52.4 gigahertz (GHz) or greater.

11. The base station of claim 8, wherein the complementary binary sequence pair is selected from a set of 15 pre-identified complementary sequences.

12. The base station of claim 11, wherein the first binary sequence is a(i) and the second binary sequence is b(i), and the set of 15 pre-identified complementary sequences are:

| # | 1st Sequence-a(i) | 2nd Sequence-b(i) |
|---|---|---|
| 0 | 1 0 0 1 1 1 1 1 0 1 0 | 1 0 0 1 1 |
| 1 | 0 1 0 1 0 0 1 1 1 0 0 | 1 1 1 1 1 |
| 2 | 0 0 0 0 1 0 0 1 1 1 0 | 0 0 1 0 1 |
| 3 | 1 1 0 0 0 0 1 0 0 1 0 | 0 1 0 0 1 |
| 4 | 0 1 1 0 1 1 1 1 0 1 0 | 0 0 0 1 1 |
| 5 | 1 0 0 0 1 1 0 1 0 1 1 | 1 1 1 0 1 |
| 6 | 0 1 1 1 1 1 0 1 1 0 0 | 0 1 1 0 1 |
| 7 | 1 1 1 0 1 1 0 1 0 0 0 | 1 1 1 0 1 |
| 8 | 0 0 1 1 0 1 0 1 1 1 1 | 1 1 0 0 1 |
| 9 | 1 1 1 1 1 0 0 1 0 0 1 | 1 0 1 0 1 |
| 10 | 0 1 0 0 0 0 0 1 1 0 1 | 1 0 0 0 1 |
| 11 | 1 0 1 1 0 1 1 1 0 1 0 | 0 0 1 1 1 |
| 12 | 1 0 1 1 0 0 0 1 0 1 0 | 0 0 0 0 1 |
| 13 | 0 0 1 0 0 1 1 1 1 1 0 | 1 0 1 1 1 |
| 14 | 0 1 1 1 1 0 1 1 1 0 0 | 0 1 0 1 1 1. |

13. The base station of claim 8, wherein the complementary sequence pair is related to a demodulation reference signal (DM-RS).

14. The base station of claim 8, wherein the sum of a first normalized cyclic autocorrelation function of the first binary sequence and a second normalized cyclic autocorrelation function of the second binary sequence yields ideal autocorrelation.

15. An electronic device for use in a base station, wherein the apparatus comprises:
one or more processors; and
one or more non-transitory computer-readable media (NTCRM) having instructions, stored thereon, that when executed by one or more processors cause the electronic device to:
generate a complementary binary sequence pair for transmission of a reference signal on a first antenna port, wherein the complementary binary sequence pair includes a first binary sequence for transmission on a first Discrete Fourier Transform spreading Orthogonal Frequency Division Multiplexing (DFT-s-OFDM) symbol and a second binary sequence for transmission on a second DFT-s-OFDM symbol;
modulate the complementary binary sequence pair according to π/2-BPSK modulation;
generate a modified complementary binary sequence pair, wherein generation of the modified complementary binary sequence pair includes:
reversing a sequence order of the first and second binary sequences to generate a reversed first binary sequence and a reversed second binary sequence;
associating the reversed first binary sequence for transmission on the second DFT-s-OFDM symbol and associating the reversed second binary sequence for transmission on the first DFT-s-OFDM symbol; and
switching a sign of one of the reversed first binary sequence that is to be transmitted on the second DFT-s-OFDM symbol and the reversed second binary sequence that is to be transmitted on the second DFT-s-OFDM symbol; and
use the modified complementary binary sequence pair for transmission of the reference signal on a second antenna port.

16. The electronic device of claim 15, wherein to use the modified complementary binary sequence pair for transmission of the reference signal includes to perform Discrete Fourier Transform (DFT) spreading of the modified complementary binary sequence pair.

17. The electronic device of claim 15, wherein the complementary binary sequence pair is selected from a set of 15 pre-identified complementary sequences.

* * * * *